(12) United States Patent
Reising et al.

(10) Patent No.: US 9,217,227 B2
(45) Date of Patent: *Dec. 22, 2015

(54) SAFETY SURFACE

(71) Applicant: KIDSOFT LLC, Gary, IN (US)

(72) Inventors: Gregory S. Reising, Gary, IN (US);
George McGuan, Gary, IN (US);
Richard Hagelberg, Gary, IN (US)

(73) Assignee: KIDSOFT LLC, Gary, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/106,047

(22) Filed: Dec. 13, 2013

(65) Prior Publication Data
US 2014/0169877 A1 Jun. 19, 2014

Related U.S. Application Data

(60) Provisional application No. 61/737,058, filed on Dec. 13, 2012.

(51) Int. Cl.
| | |
|---|---|
| *E01C 13/00* | (2006.01) |
| *E01C 13/04* | (2006.01) |
| *E01C 5/00* | (2006.01) |
| *B32B 3/26* | (2006.01) |
| *E01C 3/00* | (2006.01) |
| *E01C 9/00* | (2006.01) |
| *E01C 15/00* | (2006.01) |

(52) U.S. Cl.
CPC .............. *E01C 13/00* (2013.01); *E01C 13/045* (2013.01); *B32B 3/26* (2013.01); *E01C 3/00* (2013.01); *E01C 5/00* (2013.01); *E01C 9/00* (2013.01); *E01C 15/00* (2013.01)

(58) Field of Classification Search
CPC .............. E01C 3/00; E01C 5/00; E01C 9/00; E01C 15/00; B32B 3/26
USPC .................. 404/17, 18, 27–29, 34, 36, 72, 73
See application file for complete search history.

(56) References Cited

U.S. PATENT DOCUMENTS

| | | | |
|---|---|---|---|
| 3,712,187 A * | 1/1973 | Stelling | 404/3 |
| 3,771,891 A * | 11/1973 | Nirenski et al. | 404/40 |
| 4,948,116 A | 8/1990 | Vaux | |
| 5,085,424 A | 2/1992 | Wood, Jr. | |
| 5,183,438 A | 2/1993 | Blom | |
| 5,525,416 A | 6/1996 | Katz et al. | |
| 5,823,711 A | 10/1998 | Herd et al. | |
| 6,071,039 A | 6/2000 | Ogura et al. | |
| 6,221,445 B1 | 4/2001 | Jones | |
| 6,287,049 B1 | 9/2001 | Keinholz | |

(Continued)

*Primary Examiner* — Raymond W Addie
(74) *Attorney, Agent, or Firm* — Marshall, Gerstein & Borun LLP

(57) ABSTRACT

A safety surface for use in a designated area of a playground or other activity area includes a primary shock absorbing layer formed with a plurality of bags, and a border arranged for placement along selected edges of the designated area. The bags are sized and shaped to abut adjacent bags, with a portion of the bags arranged to abut the border. Each of the bags is filled with a plurality of pieces of a shock absorbent material, and includes one or more internal dividers arranged to divide the interior of the bag into a plurality of interior compartments. A top layer is arranged to overlie the bags and arranged for securement to the border. The top layer may be formed by discrete tiles that are joined together along seams by an elongate channel connector. The border may be formed of border sections joined at articulating joints.

30 Claims, 18 Drawing Sheets

(56) References Cited

U.S. PATENT DOCUMENTS

| | | |
|---|---|---|
| 6,796,096 B1 | 9/2004 | Heath |
| 6,966,841 B1 | 11/2005 | Sherman |
| 7,198,427 B2 * | 4/2007 | Carr et al. .................. 404/75 |
| 8,668,403 B2 * | 3/2014 | Sawyer ......................... 404/28 |
| 8,770,886 B1 * | 7/2014 | Kotler .......................... 404/31 |
| 2004/0067103 A1 * | 4/2004 | Hart ............................... 404/2 |

* cited by examiner

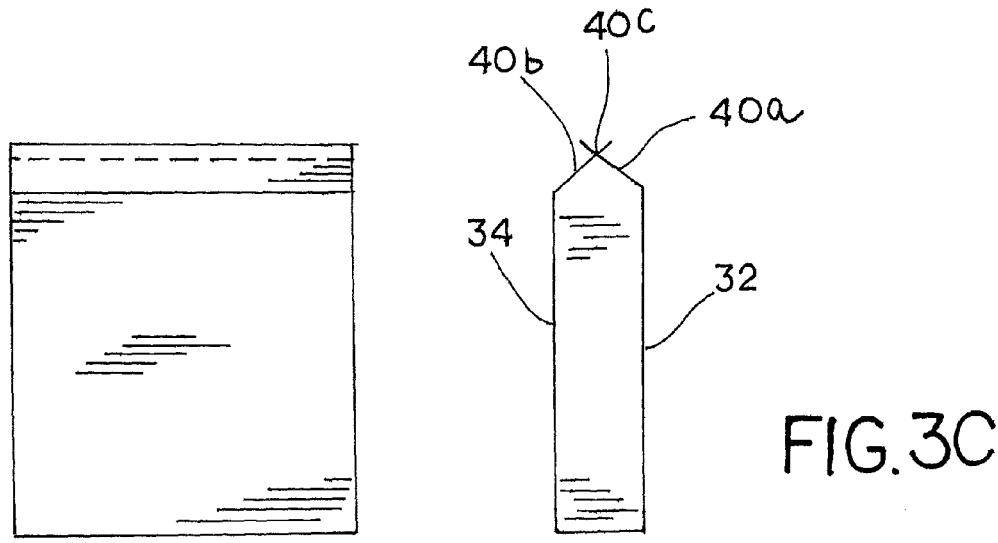
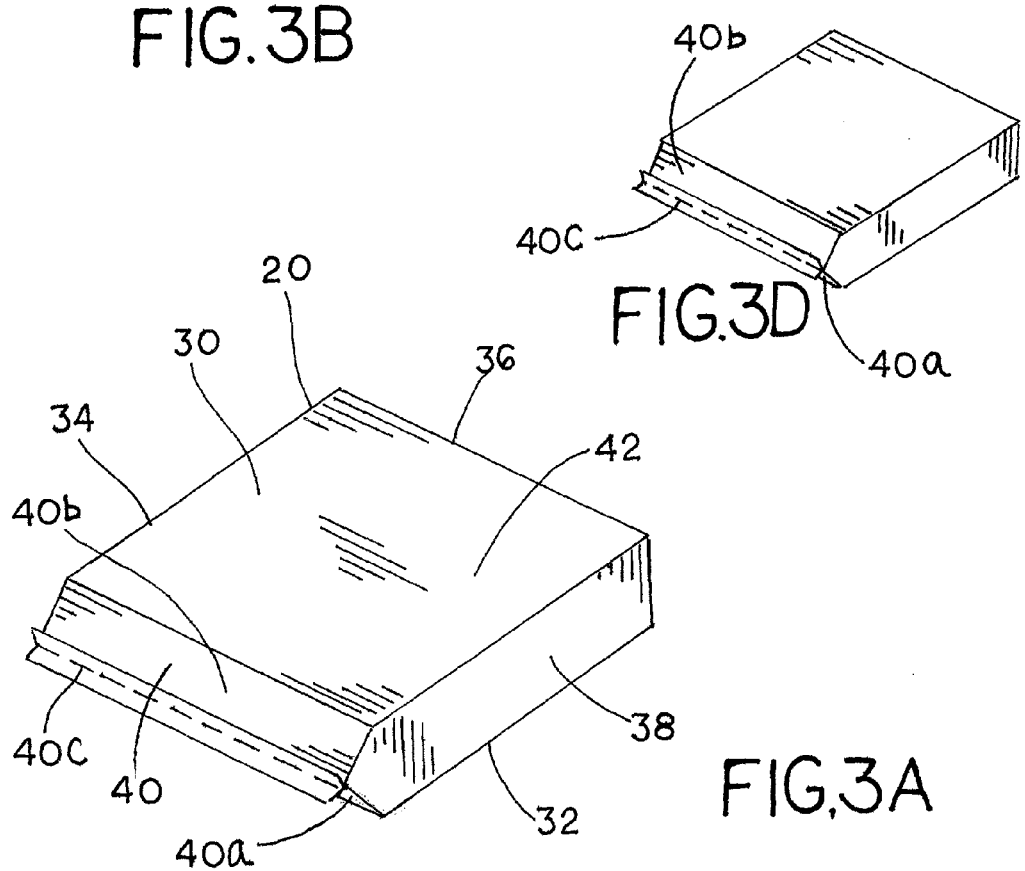

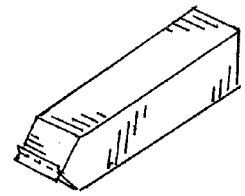
FIG.5B  FIG.5C  FIG.5D
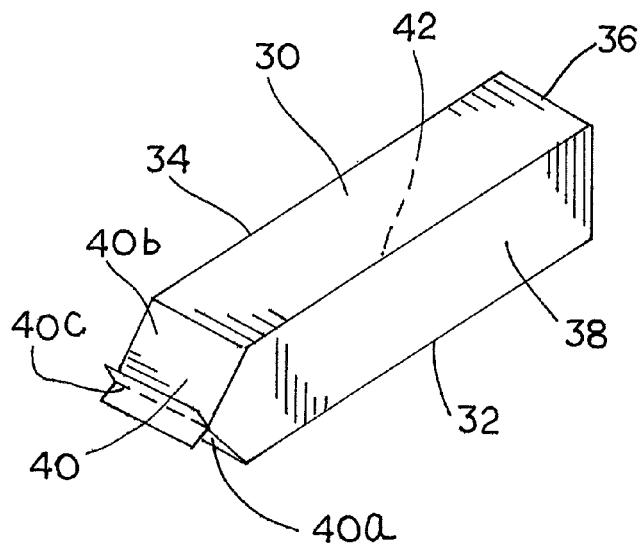
FIG.5A

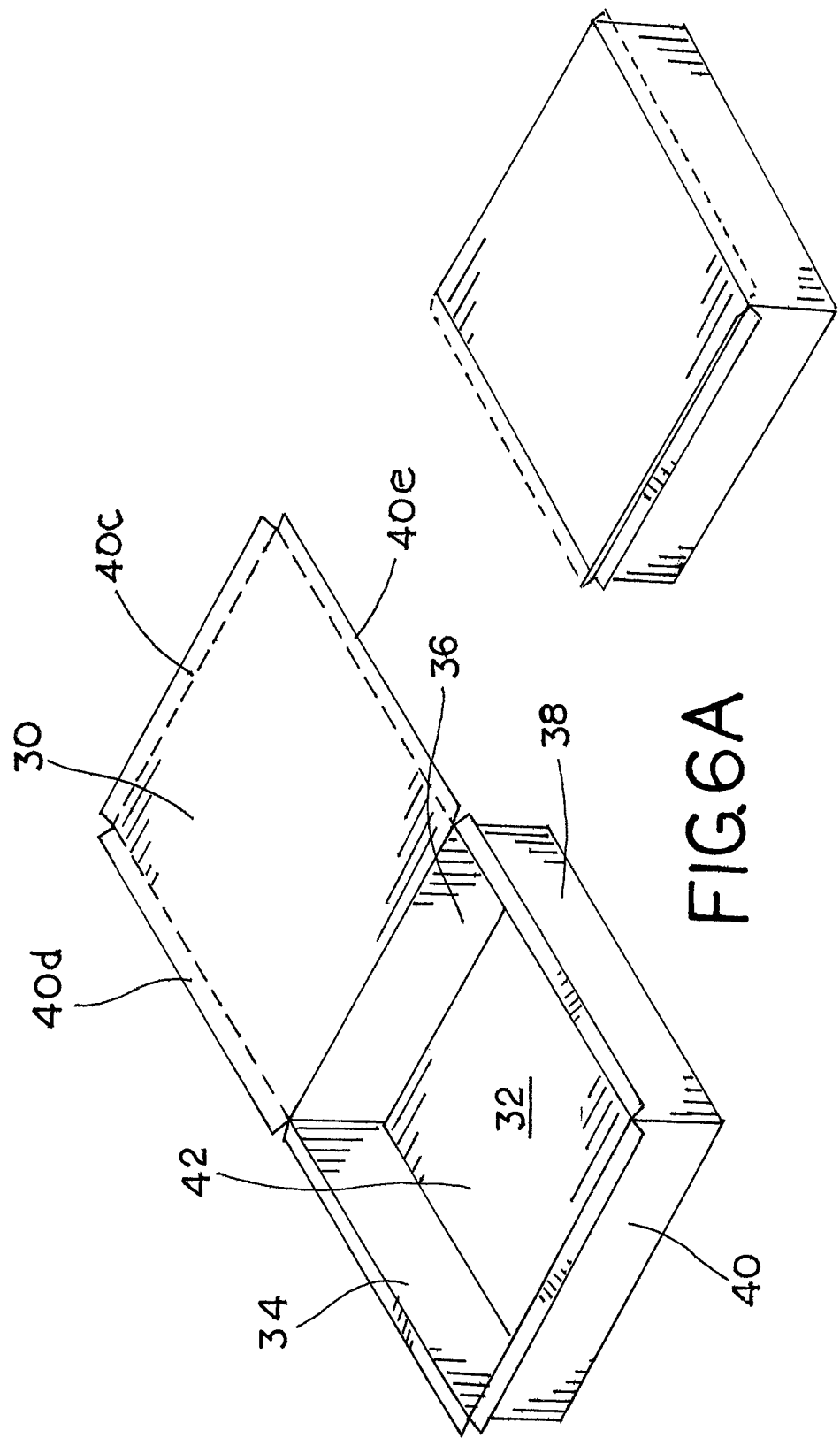

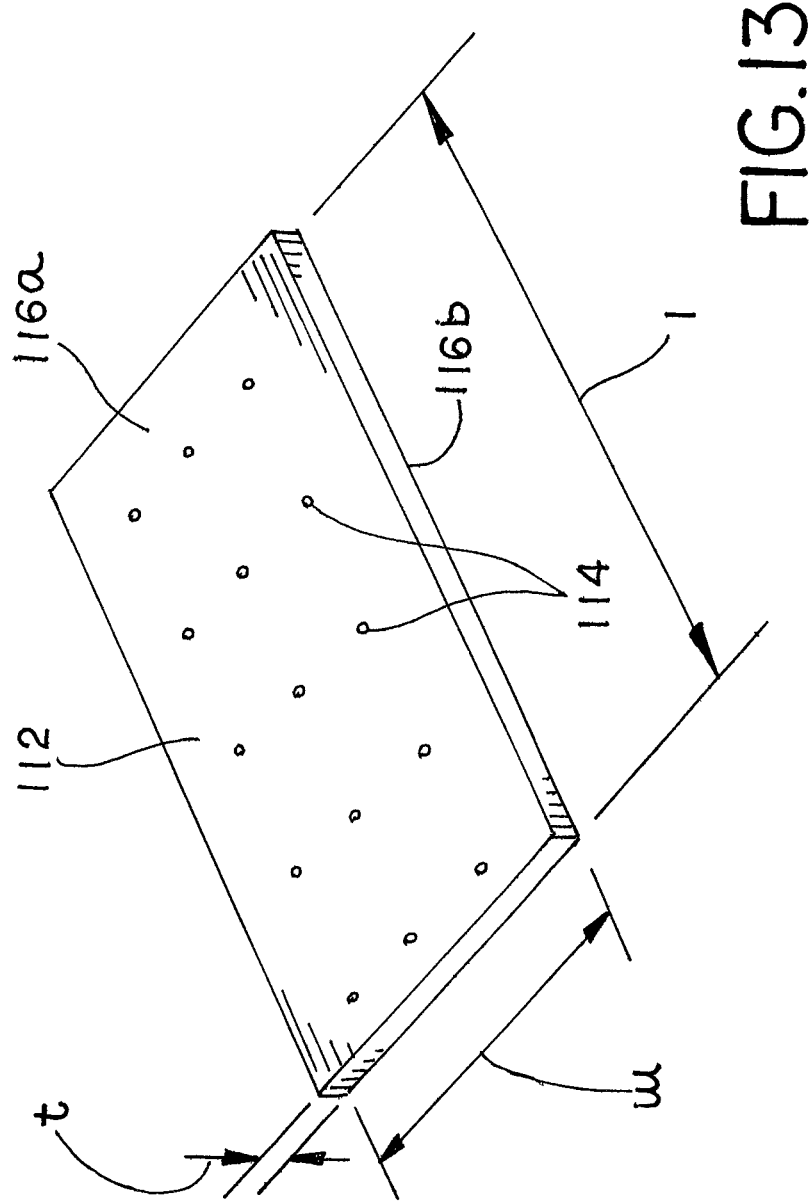

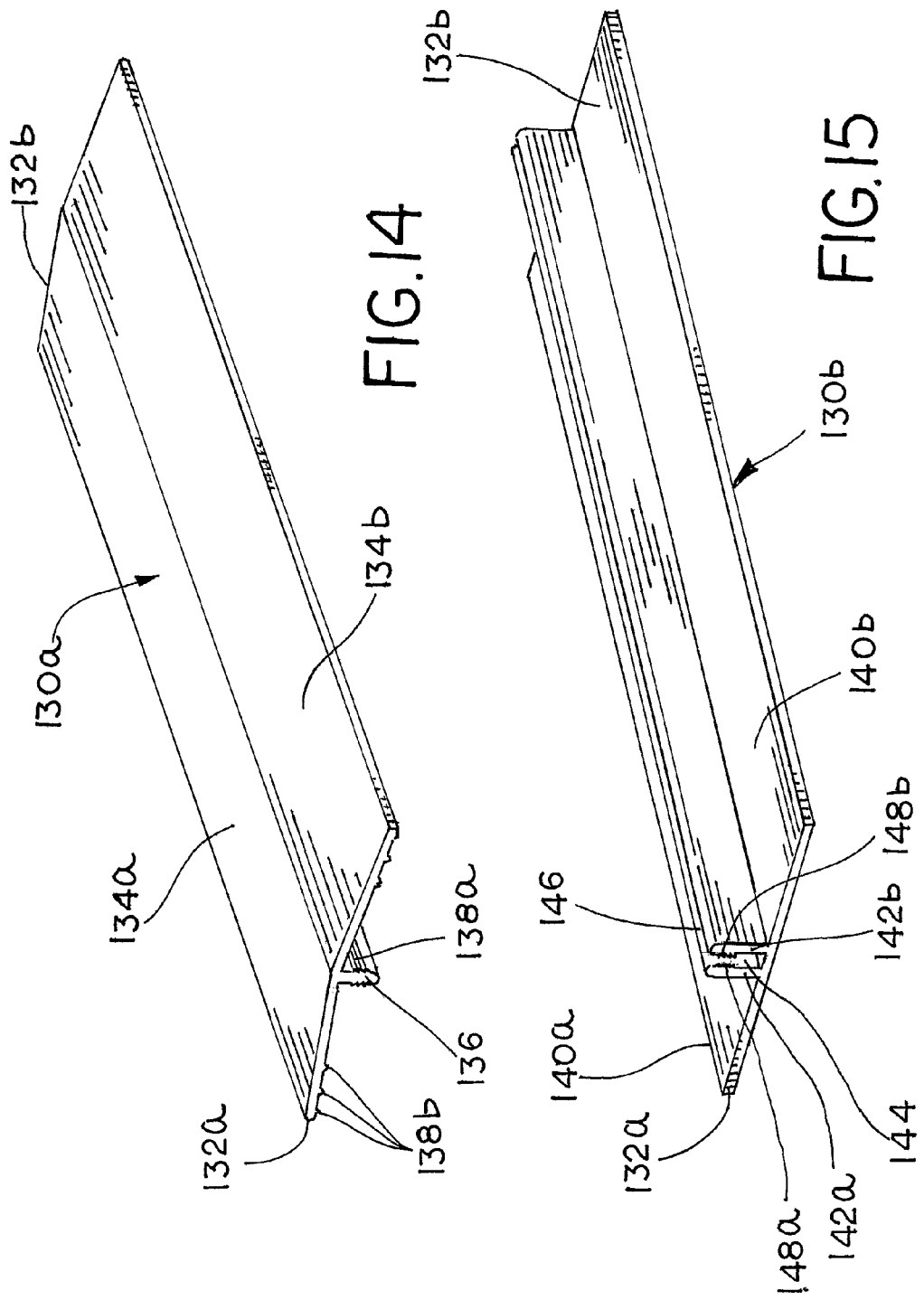

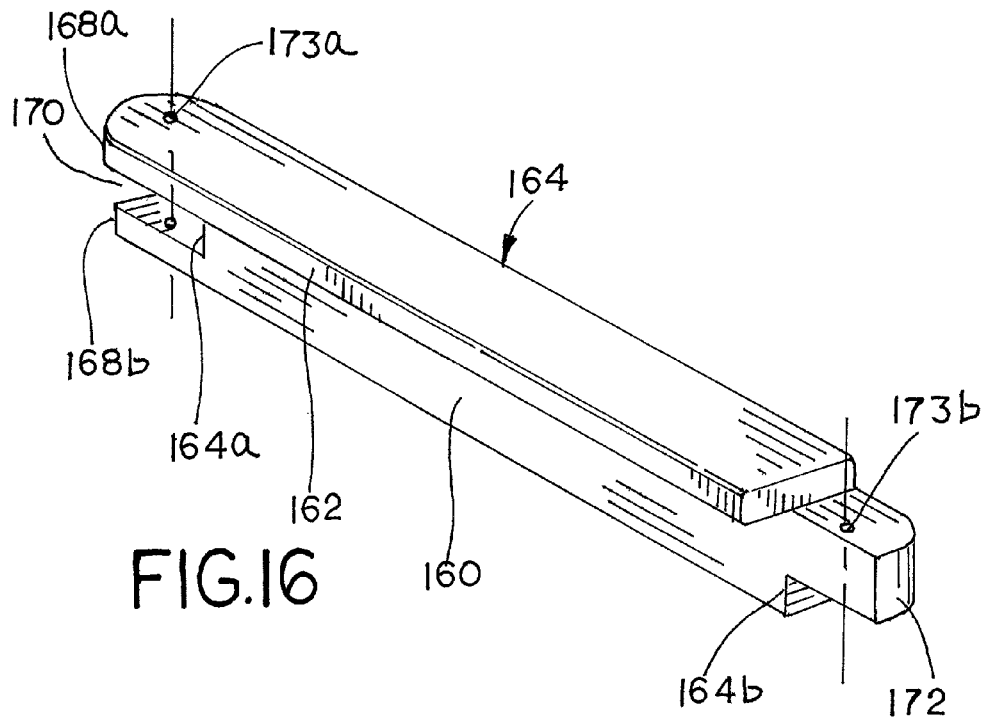
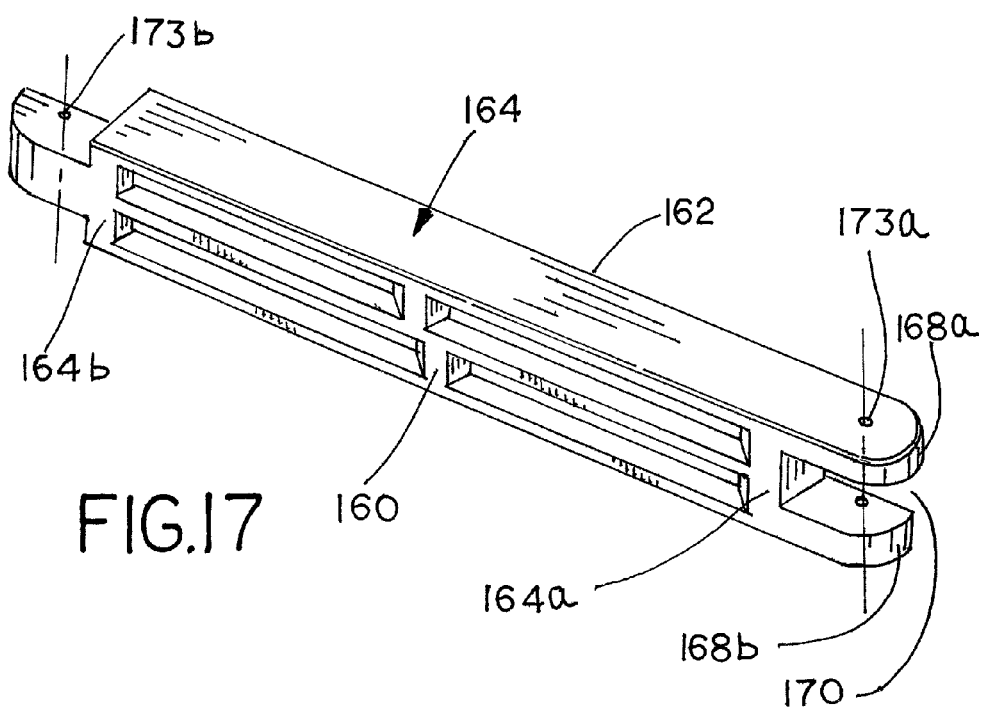

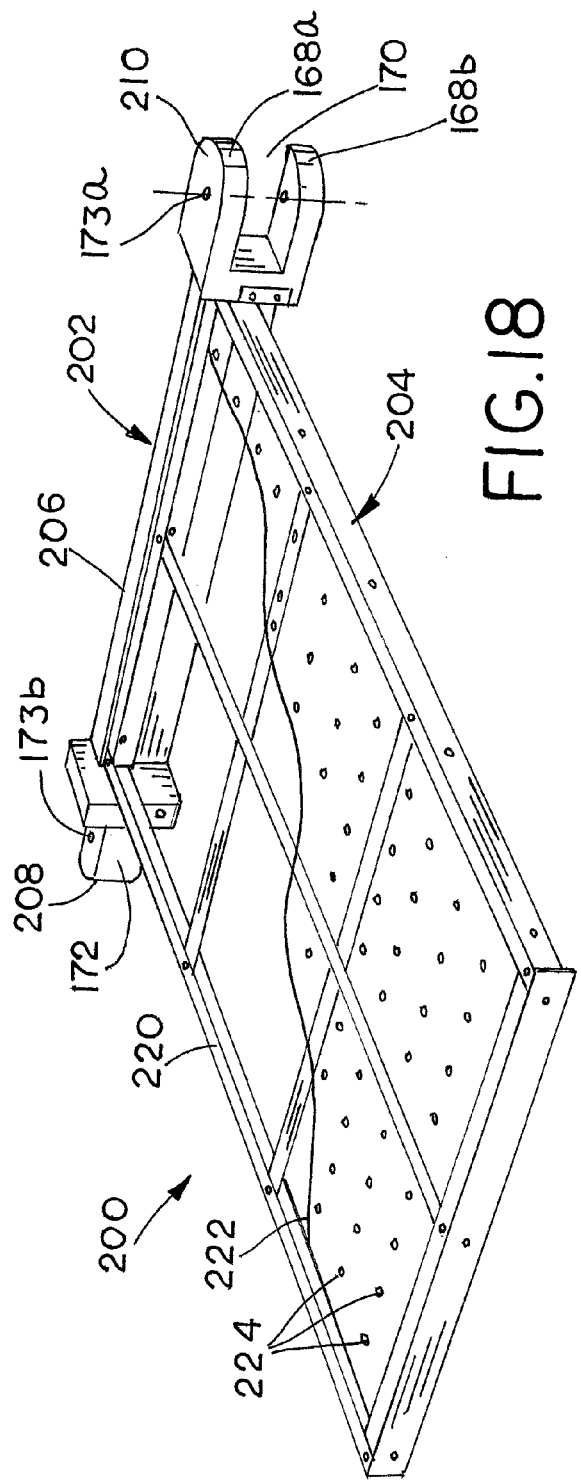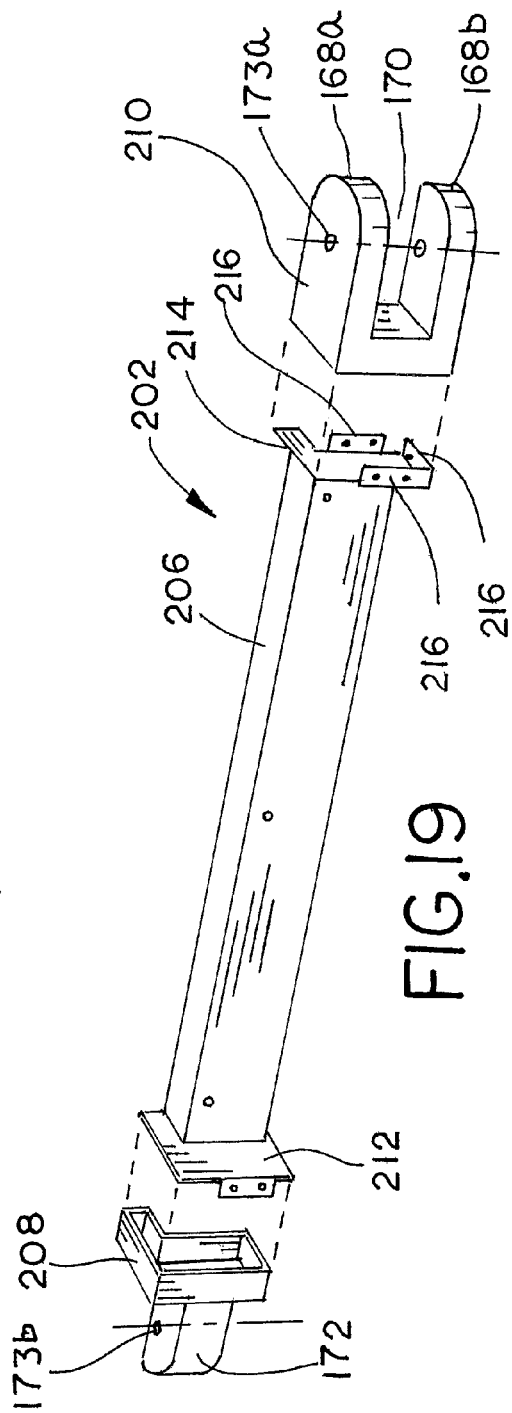

SAFETY SURFACE

FIELD OF THE DISCLOSURE

The present disclosure relates to a safety surface for use with playground systems and to playgrounds incorporating such a safety surface.

BACKGROUND

Most modern playgrounds have some form of shock absorbent safety surface intended to reduce the risk of injury. The industry has developed a number of different safety surfaces, including, for example, chipped wood products, resilient rubber foam, shredded tires, and poured-in-place rubberized surfaces.

Unfortunately, some existing safety surfaces may be prone to one or more drawbacks. For example, some applications, such as chipped wood products, absorbent rubber foam, and shredded tires offer favorable shock absorption qualities, but some of the softer options lack stability. As a result, the shock absorbent material tends to migrate away from high traffic areas, leaving many high traffic areas of a playground unprotected. On the other hand, many poured-in-place surfaces are very stable and thus not subject to migration, but these more stable options are often harder than desired. It can be difficult to find the proper balance between stability and shock absorption, and thus many playgrounds can benefit from an improved surface that offers favorable shock absorption as well as resistance to migration.

SUMMARY

In accordance with some exemplary aspects, a safety surface for use over a supporting base in a playground area includes a primary shock absorbing layer, a border along a horizontal periphery of the primary shock absorbing layer, and a top layer overlying the primary shock absorbing layer and defining an activity surface. The top layer is flexible and is retained by the border. The border and the top layer prevent the bags from migrating relative to each other.

In accordance with the foregoing aspects, a safety surface according to the present teachings may further include any one or more of the following preferred arrangements and/or features.

The safety surface may be used to cover a designated activity area of a playground, athletic field, exercise area, and the like.

In some preferred optional arrangements, the primary shock absorbing layer is formed of a plurality of bags disposed horizontally adjacent each other across the playground area, each bag being flexible and filled with a plurality of pieces of shock absorbent material.

In some preferred optional arrangements, the top layer is formed of at least a first piece and a second piece joined together by a channel connector extending along a seam between the first piece and the second piece.

In some preferred optional arrangements, the channel connector has an upper connector portion and a lower connector portion. The upper connector portion is disposed above the first and second pieces. The lower connector portion is disposed below the first and second pieces. The upper connector portion is interlocked with the lower connector portion. The upper connector portion may form an elongate male interlocking profile, and the lower connector portion may form an elongate female interlocking profile. The upper connector portion may have a first flange and a second flange. The lower connector portion may have a third flange and a fourth flange. The first piece may be clamped between the first and third flanges, and the second piece ay be clamped between the second and fourth flanges. An adhesive may be disposed along at least one of the first through fourth flanges and adhering the first piece to the lower connector portion. A gripping ridge may be disposed along at least one of the flanges. The gripping ridge may be engaged against at least one of the first and second pieces to prevent the piece from pulling away from the seam. The upper connector portion may have an unflexed position and a flexed position, wherein the first and second flanges are coplanar in the flexed position and at least one of the first and second flanges is angled away from coplanarity in the unflexed position.

In some preferred optional arrangements, each of the first piece and the second piece is in the form of a tile. The tile may be in the form of a planar sheet. The tile may have a thickness and a rectangular peripheral edge defining a length and a width.

In some preferred optional arrangements, the top layer and the primary absorbing layer are porous. The top layer may include a plurality of drain holes.

In some preferred optional arrangements, a lower layer is disposed below the primary shock absorbing layer. The lower layer may be formed of a porous geotextile.

In some preferred optional arrangements, a base layer is disposed underneath the primary shock absorbing layer to provide structural support to the primary shock absorbing layer and the top layer. The base layer may be formed of a porous and/or granular material.

In some preferred optional arrangements, the primary shock absorbing layer is disposed on the base layer.

In some preferred optional arrangements, the base layer is disposed on the lower layer.

In some preferred optional arrangements, the border comprises an elongate body and a lip. The elongate body abuts the periphery of the primary shock absorbing layer and the top layer. The lip overhangs the top layer to retain the top layer.

In some preferred optional arrangements, the border comprises a plurality of border sections including at least a first border section and a second border section. The first border section is articulably joined to the second border section at an articulating joint. The articulating join may be formed of a pin extending through aligned first and second bores of the first and second border sections. The pin may extend past the bottom of the first and second border sections to anchor the border in place. The pin may extends into the support surface.

In some preferred optional arrangements, the support surface is the ground.

In some preferred optional arrangements, at least one of the bags is formed of water permeable material.

In some preferred optional arrangements, at least one of the bags has an interior divided into a plurality of compartments by one or more dividers, each compartment containing shock absorbent material.

In some preferred optional arrangements, a surface layer is disposed over the top layer. The surface layer may include a mat of imitation turf. A peripheral edge of the surface layer preferably may be retained underneath the lip of the border.

In some preferred optional arrangements, the safety surface includes an access ramp. The access ramp may include a border section and a ramp section. The border section may articulably connect to at least one of a first end of the border and a second end of the border. The ramp section may form an inclined plane to a top surface of the border portion.

These and other aspects, preferred optional arrangements, and features become more apparent with reference to the following detailed description and drawings.

BRIEF DESCRIPTION OF THE DRAWINGS

FIGS. 3A-3D are enlarged views of a first exemplary form of a mesh bag for containing a quantity of loose shock absorbent material for use with the disclosed safety surface.

FIGS. 5A-5D are enlarged views of a third exemplary form of a mesh bag for containing a quantity of loose shock absorbent material.

FIGS. 6A-6B are enlarged views of a fourth exemplary form of a mesh bag for containing a quantity of loose shock absorbent material.

FIG. 13 is an isometric view of an exemplary form of a top surface tile for use with the arrangement of FIG. 1 or 10.

FIG. 14 is an isometric view of a first portion of the channel connector of FIG. 12 having a male connector.

FIG. 15 is an isometric view of a second portion of the channel connector of FIG. 12 having a female connector.

FIG. 16 is an isometric view of an interior side of a border section for forming the articulable border of FIG. 10.

FIG. 17 is an isometric view of an exterior side of the border section of FIG. 16.

FIG. 18 is an isometric view of a handicap accessibility ramp, with portions cut away for ease of viewing, for use with the playground area of FIG. 10.

FIG. 19 is an isometric view of a border section of the handicap accessibility ramp shown in FIG. 18.

DETAILED DESCRIPTION OF THE DRAWINGS

Figure 1:
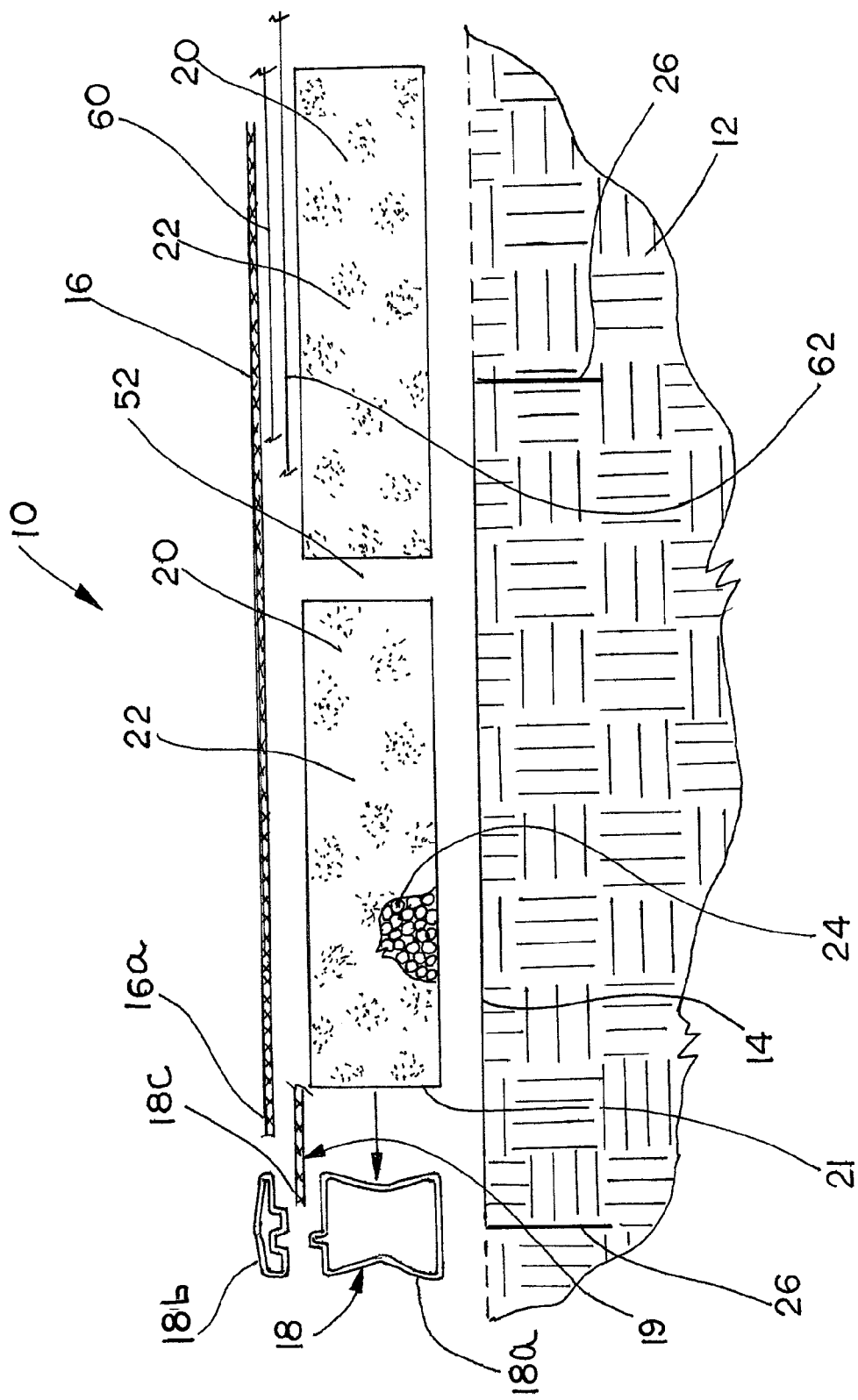
FIG. 1 is cross-sectional view, partially exploded, of a playground safety surface assembled in accordance with the teachings of the present disclosure and incorporating a fabric layer over a base, plurality of mesh bags containing a quantity of loose shock absorbent material, a top layer, and a manufactured border.
Figure 2:
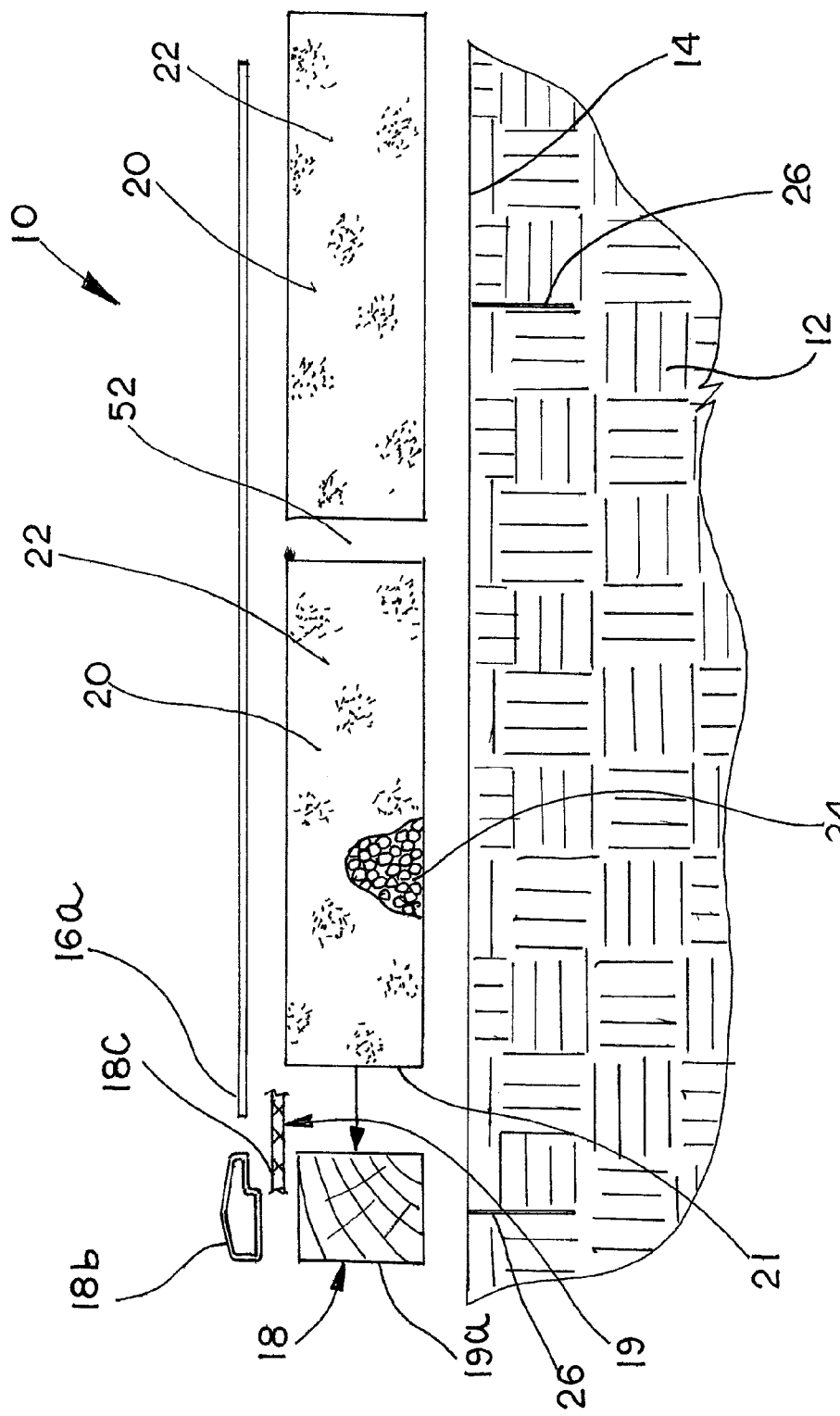
FIG. 2 is another cross-section of view, similar to FIG. 1, but illustrating a milled timber border.
Figure 4C:
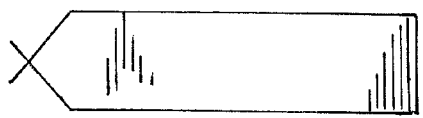
FIGS. 4A-4D are enlarged views of a second exemplary form of a mesh bag for containing the quantity of loose shock absorbent material.
Figure 4D:
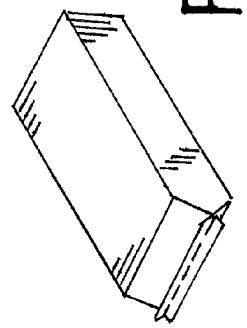
Figure 4B:
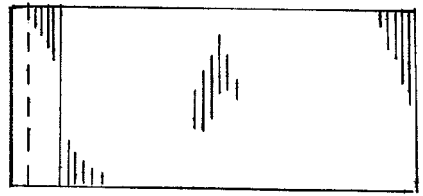
Figure 4A:
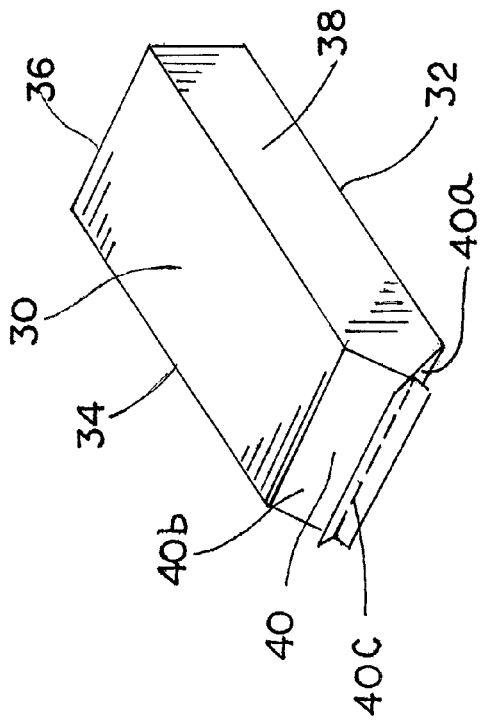

Referring now to the drawings, FIGS. 1 and 2 illustrate a safety surface 10 for a playground assembled in accordance with the teachings of a first disclosed example of the present disclosure. The playground may be any area where significant physical activity is anticipated that may result in a person falling or being pushed into the ground or similar support surface, such as for play, sport, or exercise. Some exemplary playground areas may include, a play area for young children, such as at a school or in a park, a playing area for sports and other similar physical activities, such as on a field or in a gymnasium, a physical exercise and/or training area, such as a weight room or a martial arts training area, a physical rehabilitation area, such as in a hospital or therapists office, and other areas having similar uses and/or safety needs. While the exemplary arrangements shown and described in detail herein relate generally to use of the safety surface 10 in a playground, such as for small children, the surface is not limited to such use and may be used for any area that would benefit from providing a stable shock absorbent safety surface on which physical play, sport, training, and/or exercise activities are anticipated.

The safety surface 10 is disposed over a prepared base 12 of the type commonly employed in the industry, such as, for example, compacted gravel or other suitable aggregate. Those of skill in the art will understand that the base 12 may be constructed of any other suitable material. The safety surface 10 includes a lower layer 14, a top layer 16, and a border 18. FIG. 1 illustrates a border 18 formed from a manufactured section 18a having a removable cap 18b, while FIG. 2 illustrates a border 18 formed from a milled wood section 19a having a removable cap 18b. Still other forms for the border 18 may prove suitable. In all other respects, the examples of FIG. 1 and FIG. 2 are substantially identical. In the example shown, the removable cap 18b provides an area 18c sized to receive an adjacent edge portion 16a of the top layer, forming a suitable connection 19 between the top layer 16 and the border 18. Alternatively, the safety surface 10 may be assembled with no positive connection between the top layer 16 and the border 18. Alternatively, the safety surface 10 may be formed with other suitable connections between the top layer 16 and the border 18. A plurality of bags 20 is disposed over the lower layer 14 and beneath the top layer 16, and the bags 20 are filled with shock absorbent material 22. Preferably, the bags 20 are placed so as to abut one another, and further are place such that at least some of the bags 20 are disposed along an edge 21 so as to abut the border 18. In accordance with the disclosed example, the shock absorbent material 22 is formed from a quantity of discrete pieces 24 (only a portion of the discrete pieces 24 are shown in FIGS. 1 and 2). The shock absorbent material 22 may be a shock absorbent foam, shredded tires, or any other suitable material. The bags 20 preferably are formed from any material that permits the bags to be water permeable and relatively flexible. A polymer coated mesh may be preferred, although other mesh materials, coated or uncoated, such as a polypropylene mesh or a nylon mesh material, may prove suitable. Still other materials may prove suitable.

Preferably, the lower layer 14 is a geotextile fabric, which is water permeable. A number of commercially available geotextile fabrics may prove suitable. The lower layer 14 may be suitably secured to the base 12 using a plurality of anchors 26 at suitable intervals. The geotextile may be a polypropylene, staple fiber, needlepunched nonwoven geotextile. Some suitable geotextiles include Geotex® 801 available from Propex Operating Company, LLC of Chattanooga, Tenn., Typar® Geosynthetics available from DuPont de Nemours S.àr.l, or Petromat® available from Nilex, Inc of Centennial, Colo. The top layer 16 preferably is formed from a plurality of tile sections 28 (a number of which are shown to advantage in FIG. 8). The tile sections 28 are preferably formed of a UV resistant material and preferably are also water permeable. As an alternative, a separate UV resistant layer may be provided under the top layer 16. As a further alternative, the top layer may be formed from a continuous roll of material instead of using discrete tile sections.

Referring now to FIGS. 3A-3D, 4A-4D, 5A-5D and 6A-6B, the bags 20 may be constructed in a variety of sizes so as to foster full coverage over the designated playground area, and to facilitate easy placement around supporting poles and other components of the playground equipment. In the examples of FIGS. 3A-3D, 4A-4D, 5A-5D, the bags include a top 30, a bottom 32, and four sides 34, 36, 38 and 40, all of which cooperate to surround an interior 42. As shown, the side 40 includes two panels 40a and 40b which meet along a seam 40c, which permit the side 40 to open up for filling. The seam 40c may be left open, or it may be sealed, such as by using a hook and loop closure, an adhesive, a mechanical fastener, a heat sealed or RF sealed connection, an interlock between cooperating sections or flaps, or by any other suitable mechanism. In any event, the bags 20 may come in any suitable size and/or shape in order to facilitate placement around equipment.

Preferably, the bags 20 are placed to abut one another, and preferably to abut the surrounding border 18, in a manner similar to placing brick pavers. As shown in FIGS. 6A and 6B, the bags 20 also may be formed such that the sides 34, 36, 38 and 40 are all continuous, but with the top 30 forming a panel, panels, or flaps that permit access to the interior of the bag 20 for filling. Again, the top may be sealed along the three edges 40c, 40d and 40e if desired, using any suitable means, such as heat sealing, RF welding, adhesives, fasteners, hook and loop closures, etc.

Figure 7:
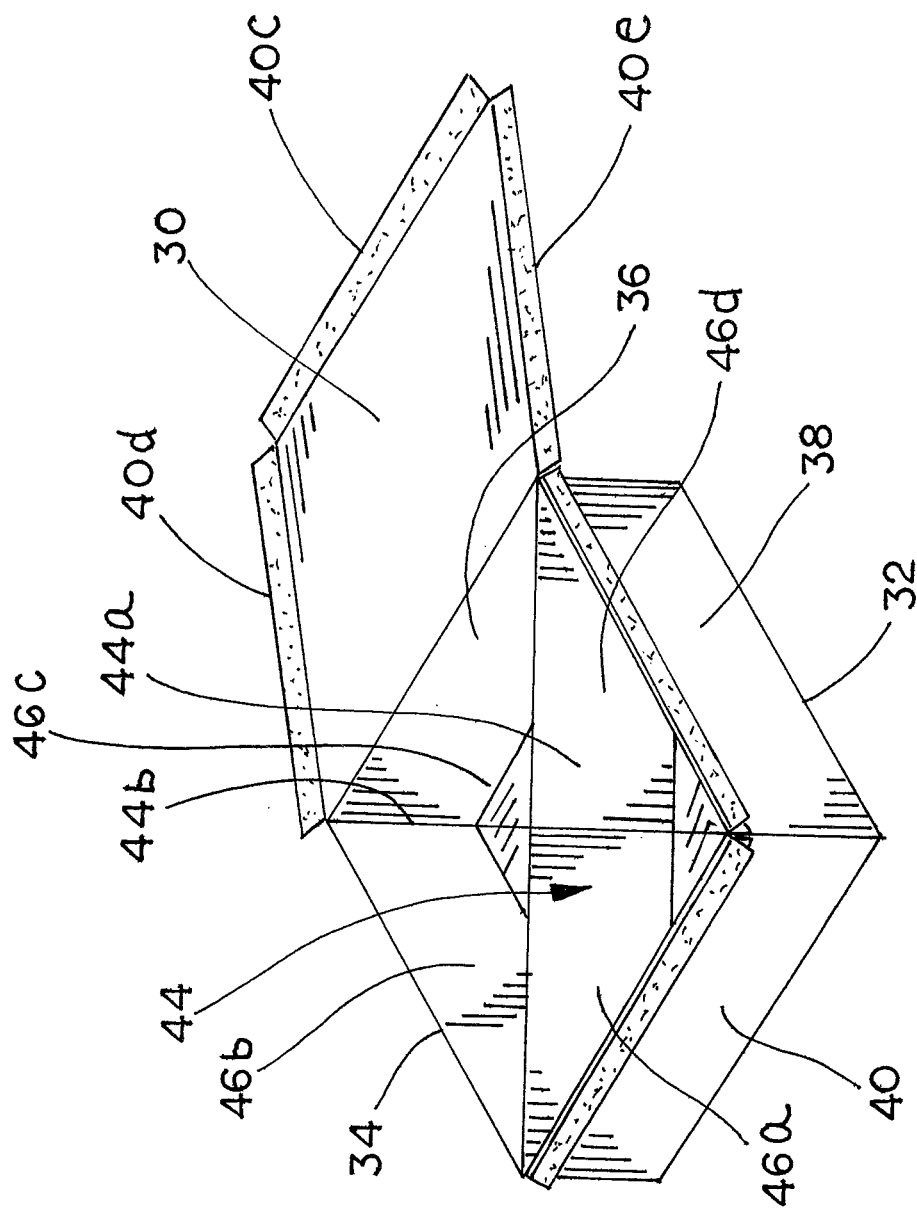
FIG. 7 is enlarged view of a fifth exemplary form of a mesh bag for containing a quantity of loose shock absorbent material, and illustrating a plurality of internal dividers which divide an interior of the disclosed mesh bag into a plurality of compartments.

Referring now to FIG. 7, any one of the foregoing bags may optionally include a divider system 44 including a number of panels 44a and 44b which, in the example shown, divide the interior 42 into four (4) compartments 46a, 46b, 46c and 46d. The divider panels 44a and 44b preferably are constructed from the same material that forms the other portions of the bags 20.

Figure 8:
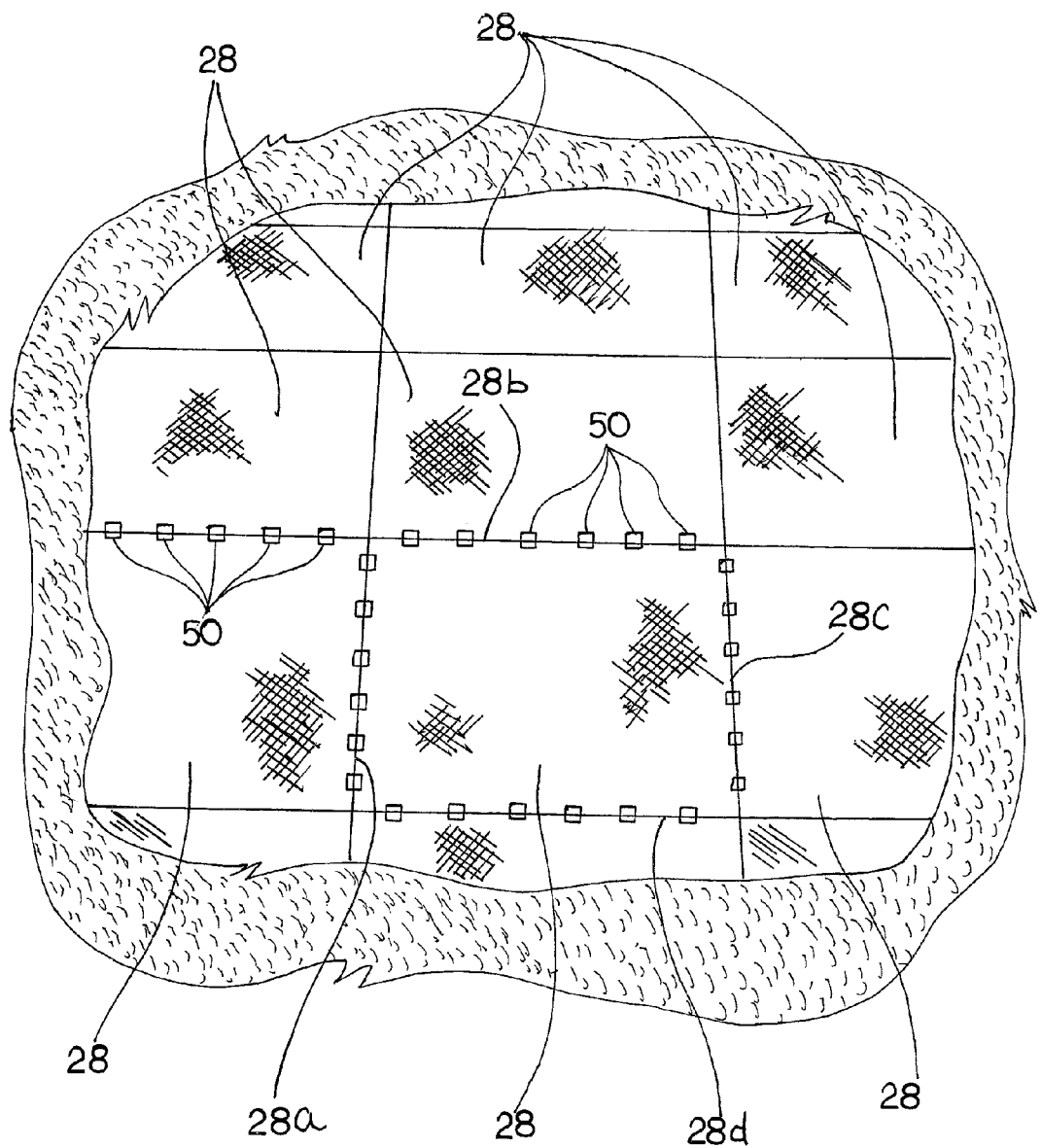
FIG. 8 is a perspective view from above illustrating an exemplary top layer formed from a plurality of interconnected sections.

Referring now to FIG. 8, each of the tile sections 28 includes a plurality of edges 28a, 28b, 28c and 28d. In the example shown, a plurality of connectors 50 is provided to facilitate attachment of the edges of adjacent tiles to one another. In one exemplary embodiment, at least one of the connectors 50 may include a first portion arranged for placement along the seam and beneath the tiles, and a second portion arranged for placement along the seam and above the tiles.

Figure 9:
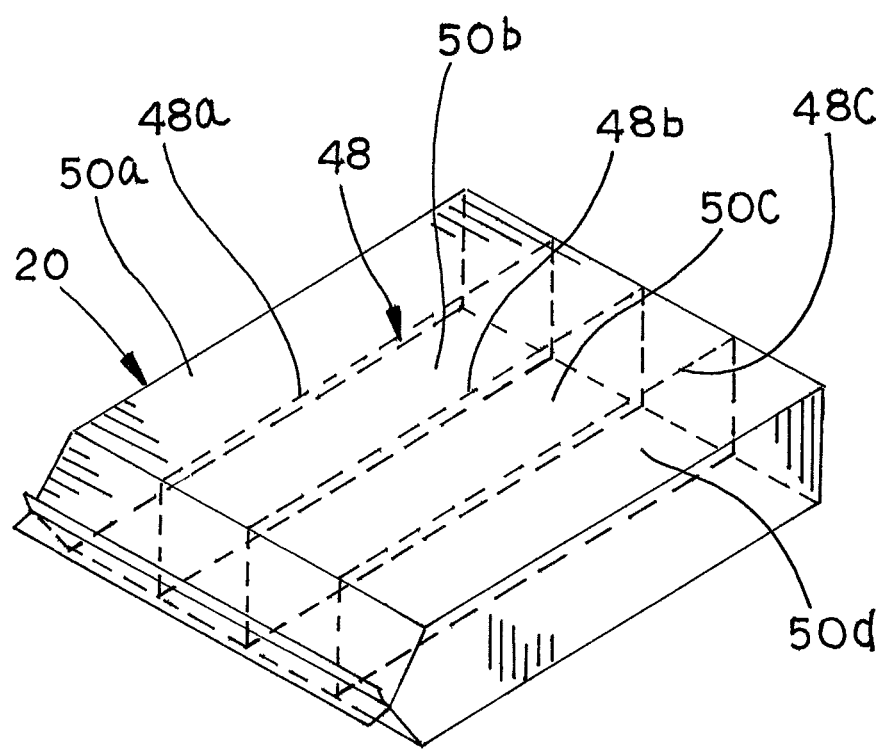
FIG. 9 is enlarged view of a yet a further exemplary form of a mesh bag for containing a quantity of loose shock absorbent material, and illustrating a plurality of internal dividers which divide an interior of the disclosed mesh bag into a plurality of compartments, and showing a pair of mesh end sections or panels which open to receive the shock absorbent material and close to contain the material.

Referring now to FIG. 9, another exemplary bag is shown, which is similar in many respect to the bag of FIGS. 3A through 3D, except that the bag of FIG. 9 includes an internal divider system 48 having a number of parallel panels 48a, 48b and 48c, dividing the interior 50 into four (4) compartments 50a, 50b, 50c and 50d. The divider panels preferably are constructed from the same material that forms the other portions of the bags 20.

Any and all dimensions shown or referred to herein are to be regarded as exemplary only and, unless expressly recited in a specific one of the appended claims, are not intended to expressly or inherently limit the scope of any of the other appended claims in any way.

In accordance with one or more aspects of the disclosed examples, when the safety surface 10 is assembled at a designated area on a playground, the bags 20 are positioned to abut adjacent bags such that the bags effectively brace one another via contact along a generally vertical interface 52 (shown in FIGS. 1 and 2) between adjacent bags. This contact between adjacent bags, in conjunction with the surrounding border, inhibits lateral and/or vertical migration of the pieces of the shock absorbent material. The addition of the internal dividers within the bags that divide the interior into compartments further act to limit lateral and/or vertical migration of the pieces 24 of the shock absorbent material 22.

Referring again to FIG. 1, the disclosed safety surface 10 may include an anti-cut layer 60 beneath the top layer 16. The anti-cut layer 60 may take the form of a wire mesh or grid, a Kevlar mesh, grid, or layer, or any other suitable material offering cut resistance. The anti-cut layer 60 offers additional protection for the bags 20 against vandalism, for example, by inhibiting or limiting a vandal's ability to make a longitudinal cut along the top portion of any one of the bags 20. As an alternative, the anti-cut layer 60 may be incorporated into the tile sections 28. Further, the system may include an anti-abrasion layer 62 over the bags 20. The anti-abrasion layer 62 may be constructed of any suitable fabric. Only a portion of the layers 60 and 62 are shown in FIG. 1, but those of skill in the art will understand that one or both layers may be included under the entire safety surface, or under only selected portions of the safety surface.

Figure 10:
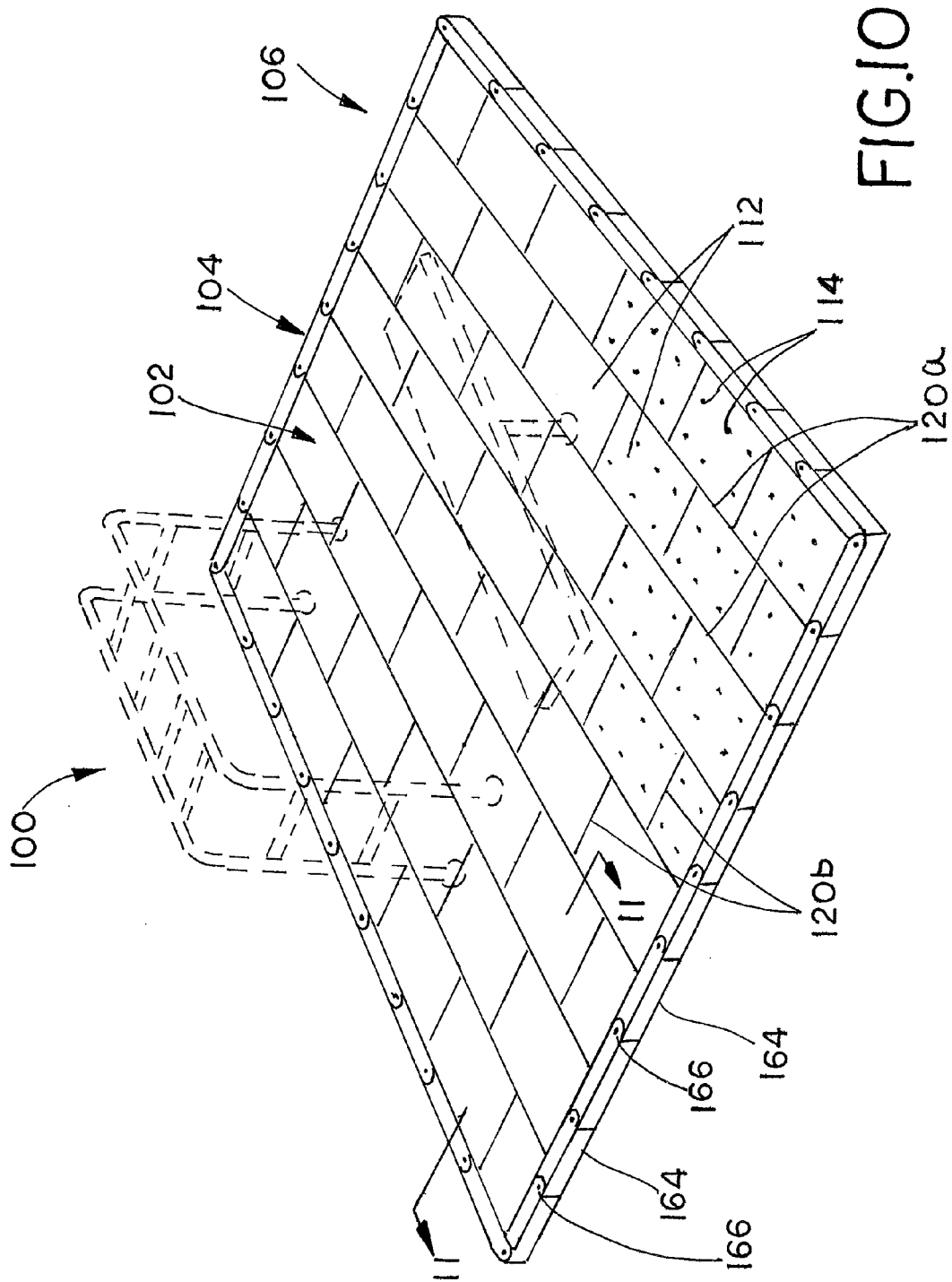
FIG. 10 is an isometric view of a playground area with a safety surface according to the teachings of the present disclosure including an articulable border, top surface tiles or mats, and channel connectors.

Turning now to FIG. 10, a playground 100 exemplifying additional aspects of the present disclosure includes another exemplary safety surface 102 and a border 104 disposed over a support surface, such as the ground 106. The safety surface 102 defines an activity surface or area defined for activity, such as play, etc.

The support surface may be any surface capable of supporting the safety surface 102, such as the ground 106, granular base, concrete, wood, or any other surface suitable for supporting a playground area. In the present example, the support surface is the ground 106 or earth.

Figure 11:
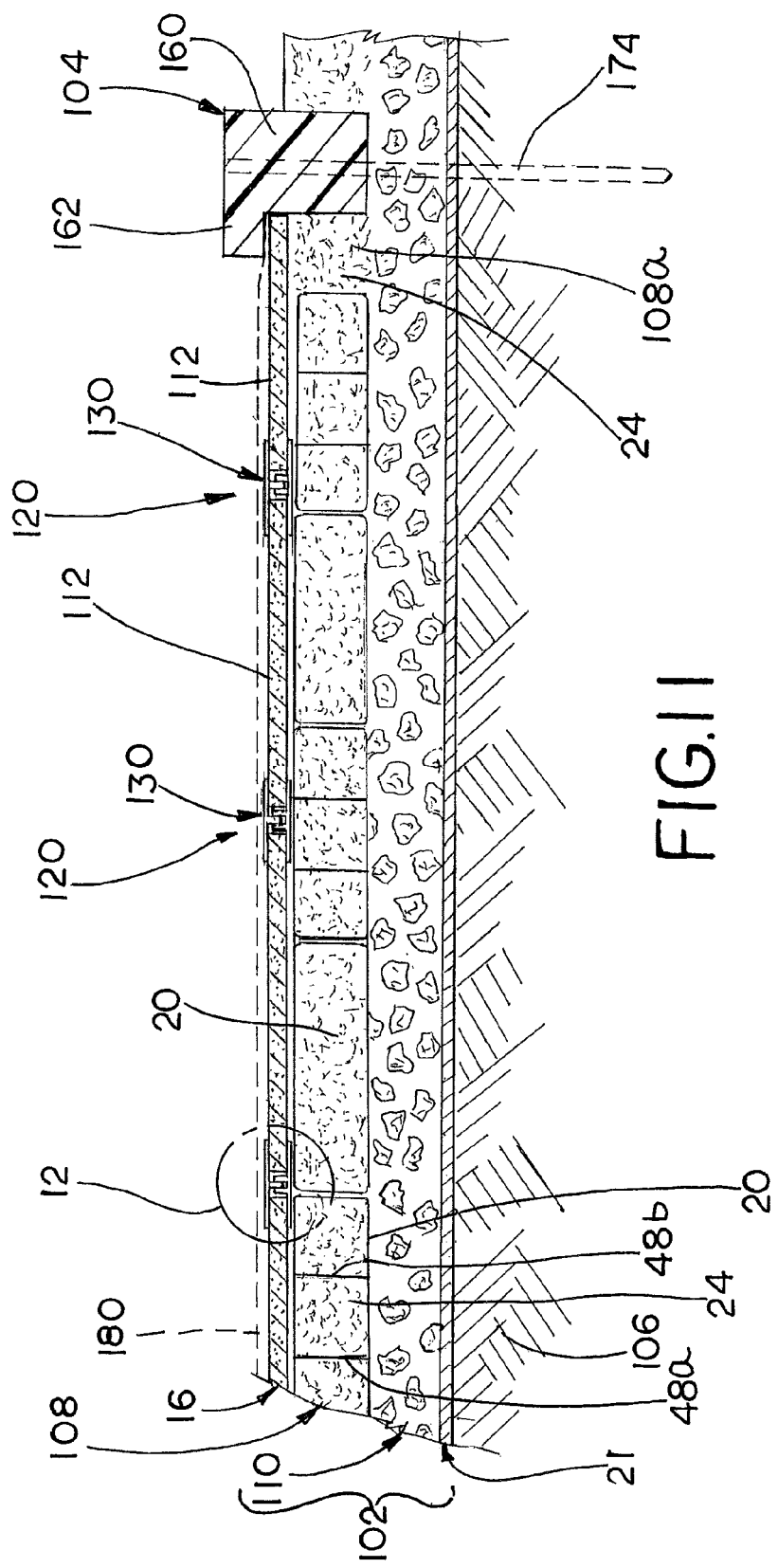
FIG. 11 is a cross-sectional view of the playground area along the lines 11-11 of FIG. 10.

With additional reference to FIG. 11, the safety surface 102 includes a top layer 16 and a primary shock absorbing layer 108. The top layer 16 is disposed over the primary shock absorbing layer 108. The top layer 16 preferably rests directly on or in contact with the primary shock absorbing layer 108. In other words, preferably, there is no intervening layer between the top layer 16 and the primary shock absorbing layer 108. However, additional layers, such as the anti-cut layer 60 and the anti-abrasion layer 62, may be disposed between the top layer 16 and the primary shock absorbing layer 108. The safety surface 102 optionally includes a base layer 110 to support the primary shock absorbing layer 108. The safety surface 102 optionally also includes a lower layer 21 to support the base layer 110.

The top layer 16 is preferably formed of a flexible and/or shock absorbent material, such as a sheet of recycled rubber. The top layer 16 is formed of a plurality of separate pieces arranged adjacent to each other in a horizontal layer such to form a substantially continuous activity surface across the playground area within the border 104. The pieces may take various shapes. Preferably, the pieces are formed with straight edges for ease of fitting adjacent each other to form the continuous activity surface. In the example of FIG. 10, the pieces are in the form of tiles 112. In other arrangements, the pieces may be in the form of strips, such as an unrolled strip of sheet recycled rubber or other flexible and/or shock absorbent material. In such an arrangement, one or more strips preferably extend across the entire length of the activity surface, e.g., from one border to the opposite border.

As best seen in FIG. 13, the tile 112 is in the form of a generally planar sheet having a constant thickness t. The tile 112 has an exemplary rectangular peripheral edge defining a length l and a width w. However, the tile 112 may have other peripheral shapes, such triangular, hexagonal, or other regular or irregular geometric shapes, and/or may have a varying thickness t. The tile 112 is formed of a soft, resilient, weather resistant material, such as recycled rubber. One or more optional drain holes 114 may be provided, which drain holes extend through the thickness t of the tile from a wear surface 116a on top of the tile 112 to the bottom surface 116b to allow water and other fluids to drain through the tile 112 when operatively installed in the safety surface 102. In some applications drain holes may not be desired. The wear surface 116a forms the activity surface of the safety surface 102 that people come into direct contact with during normal operation. The wear surface 116a preferably has a tacky finish or high coefficient of friction. However, the wear surface 116a may have different surface properties. In some arrangements, the wear surface 116a may be treated, such as with a coating (not shown), to impart a desired surface property to the activity surface.

The primary shock absorbing layer 108 is formed of a plurality of flexible containers filled with discrete pieces of shock absorbent material, such as the bags 20. The flexible containers may be or include any of the bags 20 described herein. The bags 20 are arranged in a generally horizontal layer, with each bag placed horizontally adjacent one or more adjacent bags 20. Preferably, adjacent bags 20 abut each other to form a generally horizontal, substantially continuous surface across substantially the entire area of the safety surface 102 over the ground 106 as previously described herein.

Preferably, the outer periphery of the outer peripheral bags 20 in the primary shock absorbing layer also abuts the border 104. However, in some arrangements, a small space 108a may be left between the outer bag 20 and the border 104. This small space 108a may be filled in with a shock absorbent fill, such as the discrete pieces 24, or another type of fill, such as sand. Additional fill, such as discrete pieces 24, may be filled into any interstitial spaces between the bags 20.

The base layer 110 preferably provides structural support to the primary shock absorbing layer 108 to prevent the safety surface 102 from unwanted settling, heaving, or other undesired movement, particularly when the safety surface 102 is supported by the ground. The base layer 110 preferably is also water permeable to allow water to drain therethrough. The base layer 110 may be formed of, for example, crushed rock, sand, stone, crushed concrete or masonry, other types of debris, and/or other similar granular structural materials. The primary shock absorbing layer 108 is carried by the base layer 110. Preferably, the primary shock absorbing layer 108 is disposed directly on top of the base layer 110. However, one or more additional layers or items, such as a geotextile or wire mesh, may be disposed between the base layer 110 and the primary shock absorbing layer 108 as desired for structural stability or for other purposes.

The lower layer 21 is preferably a sheet of porous material. The lower layer 21 preferably stabilizes the base layer 110, for example, by limiting horizontal shifting of the base layer 110 with respect to the ground. Preferably, the lower layer 21 is a geotextile for limiting lateral displacement of the ground and/or the granular pieces of the base layer 110 and for allowing water to drain from the base layer 110 into the ground 106.

Optionally, the lower layer 21 may be disposed between the base layer 110 and the primary shock absorbing layer 108 and/or a geotextile layer may be disposed both above and below the base layer 110.

Figure 12:
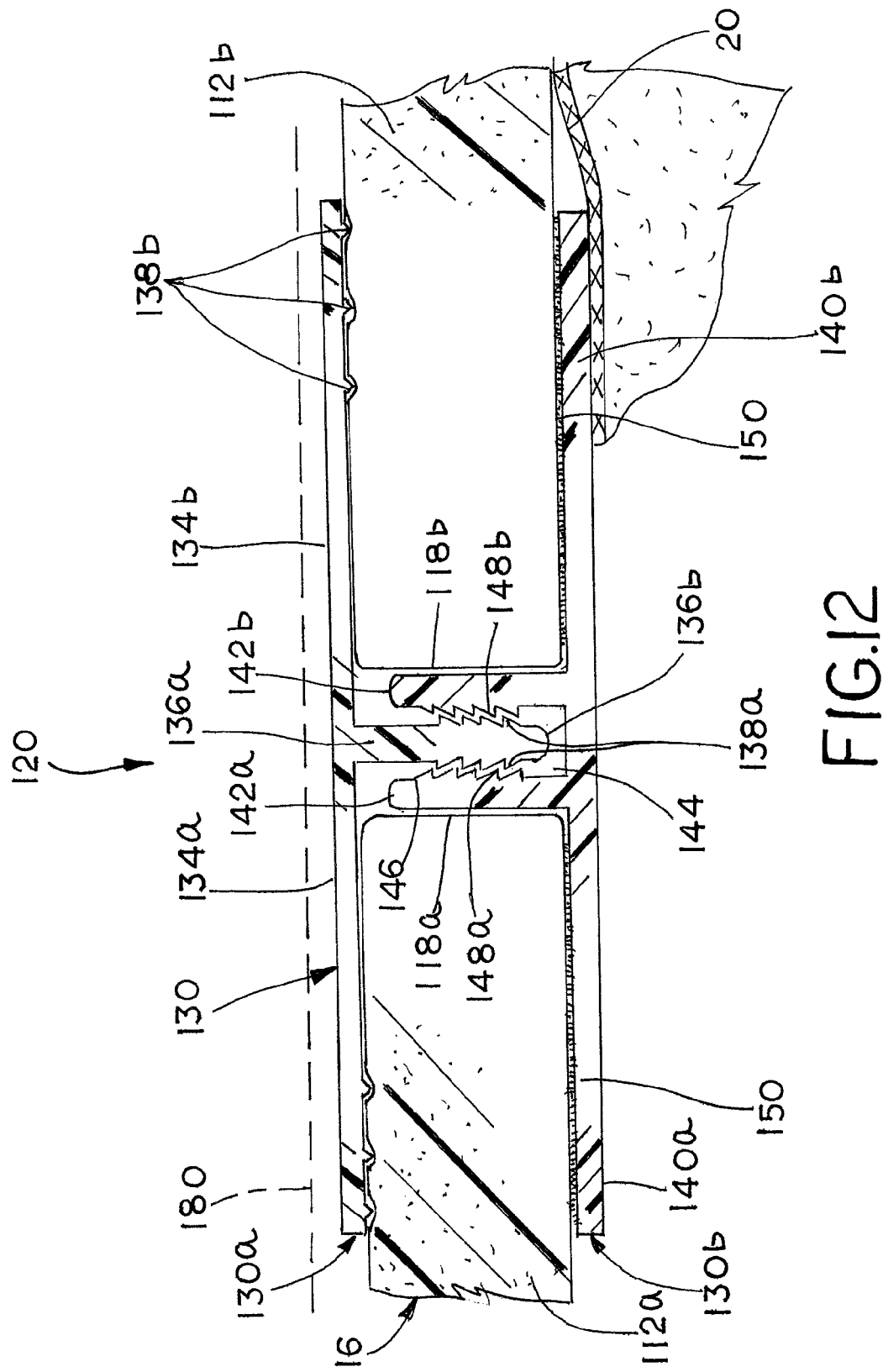
FIG. 12 is an enlarged detailed cross-sectional view of a joint along the top layer of the safety surface connected by a channel connector at the circled area of FIG. 11.

With additional reference to FIG. 12, opposed facing edges 118a, 118b of adjacent tiles 112 are joined together along seams 120. The tiles 112 may be arranged in offset rows as shown in FIG. 10 to form longitudinal seams 120a and transverse seams 120b. The longitudinal seams 120a extend between adjacent rows of the tiles 112. The longitudinal seams 120a may extend entirely across a width of the activity surface. The transverse seams 120b extend between adjacent longitudinal seams 120a. The tiles 112 are preferably arranged such that the transverse seams 120b in one row of tiles 112 are offset from the transverse seams 120b in the adjacent rows of tiles 112. Alternatively, one or more rows may be formed of a continuous strip of material, thereby eliminating or reducing the number of transverse seams 120b. For example, the rows may be formed from the same material forming the tiles 112 but in a continuous roll form and unrolled over the primary shock absorbing layer 108.

A channel connector 130 can be disposed along each seam 120 to connect the adjacent tiles 112 together along the seam. As best seen in FIGS. 12, 14, and 15, the channel connector 130 has an elongate profile forming a generally H-shaped cross-section that extends from a first end 132a to a second end 132b. The channel connector 130 is formed of an upper, first connector portion 130a having a male interlocking profile and a lower, second connector portion 130b having a female interlocking profile. The first and second connector portions 130a, 130b lock together to form the H-shaped cross-section profile. Although the first and second connector portions 130a/b are described in a preferred upper and lower relation in relation to FIG. 12, the orientation may be reversed such that the first connector portion 130a is used as a lower connector portion and the second connector portion 130b is used as an upper connector portion.

The first connector portion 130a has a T-shaped cross-sectional profile including a pair of flanges 134a, 134b and a web 136 forming a male interlocking profile. The flanges 134a, 134b are generally coplanar as described hereinafter. The web 136 extends transversely from a first side of the flanges 134a, 134b with a proximal end 136a connected between and along the flanges 134a/b and a distal end 136b spaced from the flanges 134a/b. A plurality of parallel locking ridges formed by barbs 138a is disposed on each opposite side of the web 136.

Optionally, one or more gripping ridges 138b are disposed along each of the flanges 134a/b to grip against the top or bottom surface of the tiles 112. The gripping ridges 138b may have any profile suitable for gripping the surface of the tiles 112, such as an asymmetric saw tooth cross-section or other triangular cross-section. The gripping ridges 138b are disposed on the same side of the flanges 134a/b as the web 136. Preferably, the gripping ridges 138 b are spaced apart and disposed toward the distal ends of the respective flanges 134a/b.

The second connector portion 130b has a split T-shaped cross-sectional profile including a pair of flanges 140a, 140b and a pair of spaced apart webs 142a, 142b forming a female interlocking profile that interlocks with the male interlocking profile of the first connector portion 130a. The flanges 140a/b are preferably coplanar. The flange 140a extends laterally outwardly in a first direction (to the left as seen in FIG. 12) from the web 142a. The flange 140b extends laterally outwardly in a second direction opposite the first direction (to the right as seen in FIG. 12) from the web 142b. Each of the webs 142a, 142b extends outwardly from the same side of the flanges 140a/b. The web 142a has a proximal end connected to the flange 140a and a distal end spaced away from the flange 140a. The web 142b has a proximal end connected to the flange 140b and a distal end spaced away from the flange 140b. An elongate channel 144 is defined between the webs 142a and 142b. The channel 144 has an open end 146 into the channel opposite a closed end defined by the flanges 140a/b. At least one locking ridge, and, preferably, a plurality of locking ridges are formed in the channel 144, for example by barbs 148a and 148b disposed on opposed facing surfaces of the webs 142a and 142b, respectively.

As best seen in FIG. 12, the barbs 148a/b are arranged to interlock with the barbs 138a when the web 136 is inserted into the elongate channel 144, thereby locking the first connector portion 130a to the second connector portion 130b in the H-channel arrangement. Preferably, one or more of the barbs 138a, the barbs 148a and/or the barbs 148b have a directionally asymmetric saw-tooth profile having a distal surface that is slanted more steeply than a proximal surface. In this arrangement, the barbs 138a, 148a, 148b easily slide past each other in a first direction as the web 136 is pressed into the channel 144 to interlock but cannot easily slide past each other (without severely deforming or breaking) in the opposite direction, thereby preventing the web 136 from pulling out of the channel 144.

At each seam 120, the second connector portion 130b is disposed on top of the primary shock absorbing layer 108, such as directly on the bags 20, along the length of opposing facing edges 118a, 118b of adjacent tiles 112a, 112b. The facing edge 118a of the tile 112a abuts the outer surface of the web 142a. The facing edge 118b of the tile 112b abuts the outer surface of the web 142b. Optionally, a layer of adhesive 150, such as epoxy or other glue or a double sided tape, is used to adhere at least one of the flanges 134a/b and/or 140a/b to the respective tile 112a/b. For example, a layer of adhesive is disposed along the surface of each of the flanges 140a and 140b to adhere the flanges to the bottom surfaces 116b of the respective tiles 112a, 112b. The web 136 is inserted into the channel 144 until the flanges 134a, 134b engage the wear surface 116a of the respective tiles 112a, 112b. The barbs 138a interlock with the barbs 148a, 148b. Further, the gripping ridges 138b engage against and into the wear surfaces 116a of the tiles 112a/b to prevent the tiles from pulling laterally away from the webs 142a/b.

Preferably, the first connector portion 130a has an unflexed position or configuration (see FIG. 14) and a flexed position or configuration (see FIG. 12). In the unflexed position, as best seen in FIG. 14, each of the flanges 134a, 134b has a planar shape that is angled in the direction of the web 136 (e.g., downwardly as illustrated in the drawings) to be slightly out of coplanarity. In the flexed position, as best seen in FIG. 12, each flange 134a, 134b has a planar shape that is flexed into substantial coplanarity by, for example, engagement against the tiles 112a/b. In a preferred arrangement, each flange 134a, 134b is angled between approximately five degrees and twenty five degrees out of plane toward the side of the web 136, and more preferably approximately fifteen degrees out of plane. The first connector portion 130a is preferably made of a resilient material, such as thermoplastic. When the flanges 134a, 134b of the first connector portion 130a are engaged against a pair of adjacent tiles 112a/b, as seen in FIG. 12, the flanges 134a/b flex upwardly and resiliently grip the tiles 112a/b, such as by resiliently pressing the gripping ridges 138 into the surface of the tiles 112a/b. In this manner, the flanges 134a/b and the gripping ridges 138 act together to help prevent the adjacent tiles 112a, 112b from shifting away from each other.

As best seen in FIGS. 10 and 11, the border 104 is disposed along the outer periphery of the safety surface 102. Preferably, the border 104 surrounds the outer peripheral edge of the safety surface 102 to retain the safety surface in a selected position on the support surface 102. The outer peripheral edge of the safety surface 102 abuts against the border 104. The border 102 has a main body 160 and a lip 162. The main body 160 is formed of an elongate member having an inner side 160a that abuts against the outer peripheral edge of the top layer 16 and the primary shock absorbing layer 108. The main body 160 preferably rests on top of the base layer 110. The lip 162 extends laterally outwardly from an upper portion of the inner side 160a, thereby forming an overhang along the inner side of the body 160. The lip 162 overhangs the outer peripheral edge of the top layer 16 to hold the outer peripheral edge down.

The border 104 is preferably articulable. Thus, the border 104 is formed of a plurality of border sections 164 that are interconnected at articulating joints 166. As best seen in FIGS. 16 and 17, each border section 164 is in the form of an elongate member defining the body 160 extending between a first end 164a and a second end 164b, and the lip 162 forming an overhang along an upper edge of the body 160. A pair of upper and lower flanges 168a, 168b project from the first end 164a of the body 164. The upper and lower flanges 168a/b are vertically spaced apart to form a groove 170 therebetween. A tongue 172 projects from the second end 164b of the body 164. The tongue 172 is sized to fit into the groove 170 between the flanges 168a/b of an adjacent border section 164. A first bore hole 173a extends vertically through the flanges 168a and 168b. A second bore hole 173b extends vertically through the tongue 172. The tongue 172 of a first border section 164 is disposed in the groove 170 between the upper and lower flanges 168a/b of a second border section 164 adjacent the first border section. The bore hole 173b of the first border section 164 is aligned with the bore hole 173a of the first border section. A pin 174 extends through the aligned bore holes 173a, 173b. The first and second border sections 164 can articulate about the pin 174 to form one of the articulating joints 166. As best seen in FIG. 10, any necessary number of the border sections 164 may be joined together, end on end, to extend around practically any size and shape of activity area to be covered by the safety surface 102. Preferably, the pins 174 are long enough to extend all the way through the joint 166 and past the bottom of the first and second border sections 164 into the ground 106 to also help anchor the border 104 in place.

In a preferred arrangement, a tile 112 has a length l of approximately forty four inches, a width w of approximately twenty two inches, and a thickness t of approximately three quarters inch. The bag has both a length and width of approximately sixteen inches and a height of approximately seven inches. The first connector portion 130a has a width between opposite distal ends of the flanges 134a/b of between approximately two and three inches, a flange thickness of approximately 0.06 inches, a height of the web 136 of approximately 0.2 inches, and the web 136 being disposed along a longitudinal centerline of the flanges 134a/b. The second connector portion 130b has a width between opposite distal ends of the flanges 140a/b of approximately two inches, a flange thickness of approximately 0.06 inches, a height of each web 142a, 142b of approximately 0.3 inches, and width of the channel 144 of approximately 0.9 inches. Preferably, the first and second connector portions 130a/b are extruded in a continuous length such that the length of the connector portions 130a/b may be cut to any desired chosen length. The pin 174 is preferably approximately three feet long. The thickness of the base layer 110 and the lower layer 21 may be chosen to accommodate any required design criteria as would be understood in the art.

Optionally, the wear surface may be defined by an additional surface layer 180 disposed over the top of the top layer 16 and the seams 120. In one example, the surface layer 180 may be a mat of synthetic turf, such as Astroturf™, to form a wear surface similar to a grassy field. Other types of wear surfaces may be used for the surface layer 180. Preferably, the surface layer 180 is a seamless mat or a plurality of mats with glued together seams forming a continuous layer extending across the entire activity surface area defined within the border 104. The peripheral edge of the surface layer 180 is preferably also retained underneath the lip 162 of the border 104, for example, to prevent curling.

FIG. 18 illustrates an access ramp 200 that can, for example, provide for wheelchair accessibility onto the safety surface 102. The access ramp 200 may be particularly useful in playground arrangements in which the border 104 extends above the surface of the surrounding support surface. For example, as illustrated in FIG. 10, the border 104 in some arrangements may form a raised curb four to five inches in height above the surrounding ground or support surface. This curb may make it difficult for a person in a wheelchair to maneuver the wheelchair onto the safety surface 102 of the playground area. Therefore, the access ramp 200 may provide a convenient surface upon which the wheelchair can be rolled up and over the curb formed by the border 104 and onto the playground area. Of course, the access ramp 200 may also have other beneficial uses.

The access ramp 200 is arranged to be substituted for one of the border sections 164 along the border 104. The access ramp 200 has a border section 202 and a ramp section 204. The border section 202 is adapted to replace one of the border sections 164 along the border 104. The border section 202 is arranged to be articulably connected to adjacent, spaced apart, opposing first and second ends of the border 104. The ramp section 204 forms an inclined plane that can support a wheeled object, such as a wheelchair, to roll over from the adjacent ground or floor over the border section 202. The inclined plane preferably extends to a top surface of the border section 202.

As best seen in FIG. 19, the border section 202 has an elongate body 206 with a first connector 208 at a first end of the body 206 and a second connector 210 at a second end of the body 206. In one arrangement, the body 206 is formed of an elongate angle section, such as a typical angle iron, having a vertical web that defines the main body 160 and a horizontal flange that defines the lip 162 of the border 104. A first end cap 212 is disposed at the first end of the angle iron. A second end cap 214 is disposed at the second end of the angle iron. The first and second end caps 212 and 214 may be coupled to the respective ends of the angle iron, for example, with welds or other fasteners. Each end cap 212, 214 is in the form of an inverted L-shaped plate and includes with one or more connector brackets 216 for connecting to the connectors 208 or 210. Each connector 208 and 210 is in the form of a hollow plastic molding with a peripheral wall that slips over and around the connector brackets 216. The peripheral wall can be secured to the connector brackets 216 with screws or other fasteners driven through screw holes, for example. Other arrangements are possible. For example, the border section 202 may be formed of single piece of molded material, such as plastic or rubber. The first and second connectors 208 and 210 are adapted to be articulably connected with adjoining border sections 164 in a similar manner as described above with respect to the border sections 164. Thus, the first connector 208 includes a tongue 172 with a vertical bore hole 173b, and the second connector 210 includes upper and lower flanges 168a and 168b that form a horizontal groove 170 and a vertical bore hole 173a through the flanges 168a/b as described previously. The first connector 206 may be articulably connected with a pin 174 in the groove 170 between upper and lower flanges 168a/b of a first adjacent border section 164. The second connector 208 may be articulably connected with a pin 174 to the tongue 172 of a second adjacent border section 164.

As best seen in FIG. 18, the ramp section 204 is formed of a frame 220 and a surface plate 222. The frame 220 is formed of a plurality of frame members, such as angle sections or tubes made or steel or aluminum, joined together to form a lightweight frame that can support the weight of a person and a wheelchair. The surface plate 222 is a flat sheet of material, such as steel or aluminum, and preferably includes a plurality of holes 224 for water drainage. The ramp section 204 is connected to the side of the body section 206 opposite the lip 162 such that the top of the surface plate 222 is horizontally aligned with the top surface of the body section 206. The top of the surface plate 222 angles downwardly from the top surface of the body section 206. The top of the surface plate 222 may have a non-slip surface finish, such as with small projections or a non-slip covering.

Figure 20:
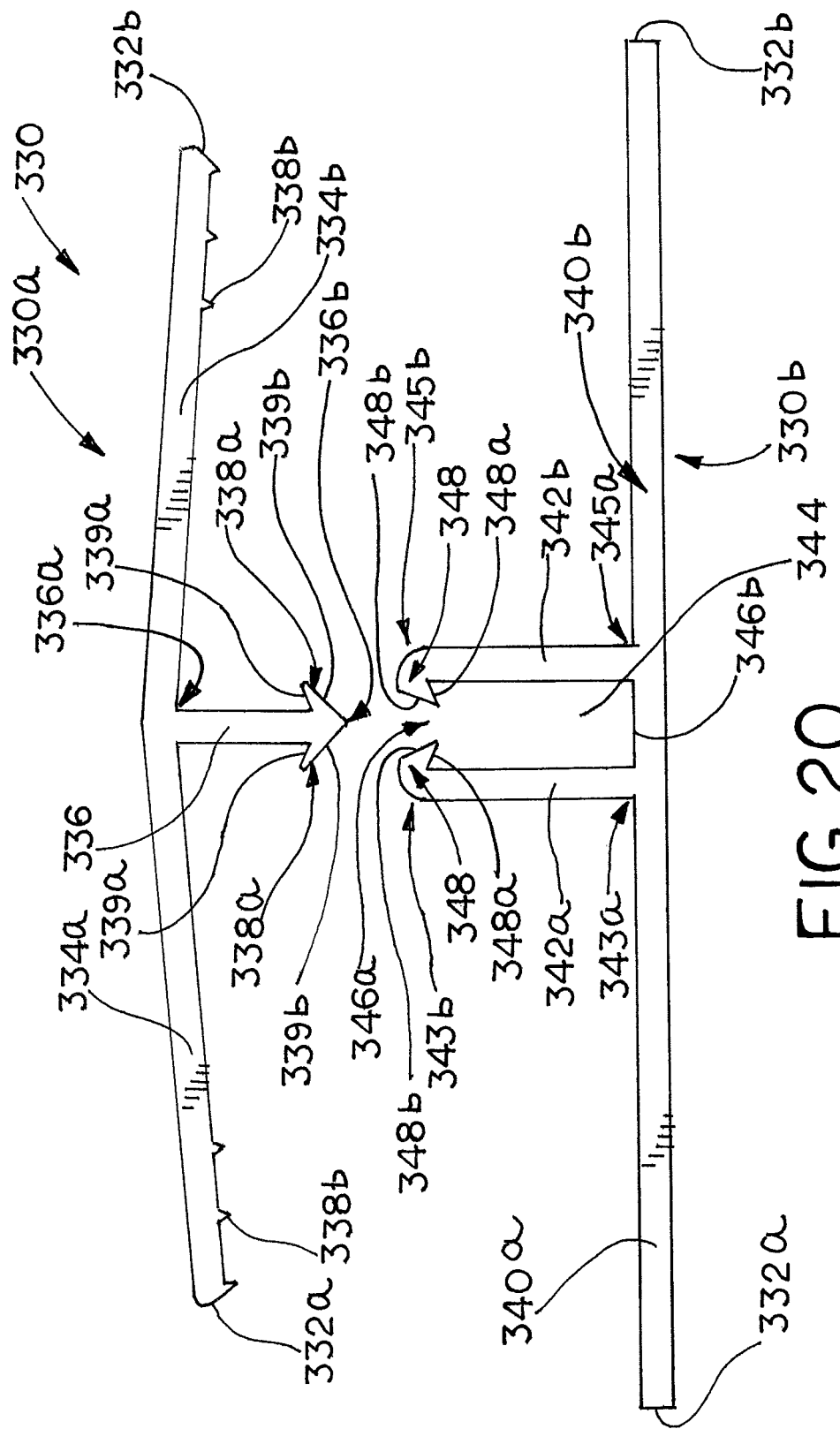
FIG. 20 is an enlarged cross-sectional view of a second exemplary channel connector that can be used to connect the joint shown in FIG. 12.
Figure 21:
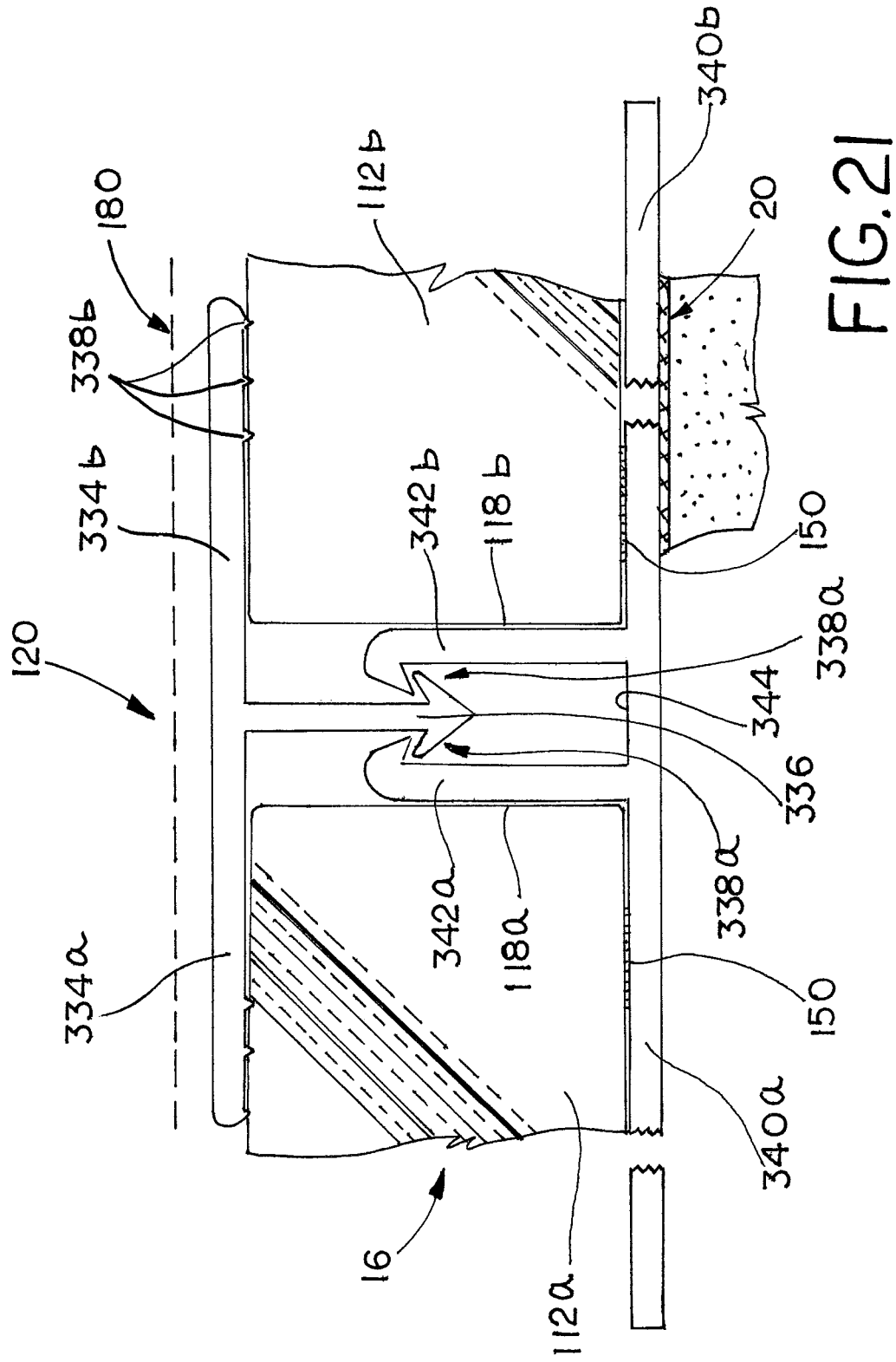
FIG. 21 is an enlarged cross-sectional view of the joint shown in FIG. 12 connected by the second channel connector of FIG. 20.

FIGS. 20 and 21 depict another channel connector 330 that can be disposed along each seam 120 to connect the adjacent tiles 112 together along the seam. Like the channel connector 130, the channel connector 330 has an elongate profile forming a generally H-shaped cross-section that extends from a first end 332a to a second end 332b. The channel connector 330 is formed of an upper, first connector portion 330a having a male interlocking profile and a lower, second connector portion 330b having a female interlocking profile. The first and second connector portions 330a, 330b can be locked together to form the H-shaped cross-sectional profile. Although the first and second connector portions 330a, 330b are described as being upper and lower connector portions, respectively, the orientation may be reversed such that the first connector portion 330a is used as a lower connector portion and the second connector portion 330b is used as an upper connector portion.

As shown in FIG. 20, the first connector portion 330a has a T-shaped cross-sectional profile that includes a pair of flanges 334a, 334b and a web 336 forming a male interlocking profile. The flanges 334a, 334b are generally coplanar as described hereinafter. The web 336 extends transversely from a first side of the flanges 334a, 334b, with a proximal end 336a connected between and along the flanges 334a, 334b and a distal end 336b spaced from the flanges 334a, 334b.

As shown in FIG. 20, the first connector portion 330a also includes a pair of barbs 338a and one or more gripping ridges 338b. The barbs 338a are disposed on and project outwardly from opposite sides of the web 336 at or near the distal end 336b of the web 336. Each of the barbs 338a is defined by a first outwardly facing surface 339a and a second outwardly facing surface 339b. Each first surface 339a is oriented at an approximately 64 degree angle relative to the web 336, while each second surface 339b is oriented at an approximately 45 degree angle relative to the web 336. In other embodiments, the first and/or second surfaces 339a, 339b can be oriented at different (e.g., greater or lesser) angles. The gripping ridges 338b are disposed along the first side of each of the flanges 334a, 334b to grip against the top or bottom surface of the tiles 112. The gripping ridges 338b may have any profile suitable for gripping the surface of the tiles 112, such as, for example, an asymmetric saw tooth cross-section or other triangular cross-section. As shown in FIG. 20, the gripping ridges 338b are disposed on the same side of the flanges 334a, 334b as the web 336. Preferably, the gripping ridges 338b are spaced apart from one another and disposed toward distal ends of the respective flanges 334a, 334b. In other embodiments, the gripping ridges 338b can be spaced closer or further apart from one another. Moreover, the gripping ridges 338b can be disposed at one or more different positions along the flanges 334a, 334b. Preferably, the flanges 334a and 334b are angled or canted slightly with respect to a horizontal plane when viewing FIG. 20. In one example, the flanges are canted at an angle of less than 10 degrees, and more 3-5 degrees, or 4.5 degrees. When the first and second connector portions are connected as shown in FIG. 21, the flanges approach a more horizontal position. Consequently, the gripping ridges 338b form a firm grip with respect to the underlying tiles 112a and 112b.

With reference still to FIG. 20, the second connector portion 330b has a split, generally T-shaped cross-sectional profile that includes a pair of flanges 340a, 340b and a pair of spaced apart webs 342a, 342b forming a female interlocking profile that interlocks with the male interlocking profile of the first connector portion 330a. The flanges 340a, 340b are preferably, but need not be, coplanar. The flange 340a extends laterally outwardly in a first direction (to the left as seen in FIG. 20) from the web 342a. The flange 340b extends laterally outwardly in a second direction opposite the first direction (to the right as seen in FIG. 20) from the web 342b. Each of the webs 342a, 342b extends outwardly from a same side of the flanges 340a, 340b. The web 342a has a proximal end 343a connected to the flange 340a and a distal end 343b spaced away from the flange 340a. The web 342b has a proximal end 345a connected to the flange 340b and a distal end 345b spaced away from the flange 340b.

As shown in FIG. 20, the second connector portion 330b also includes an elongate channel 344 defined between the webs 342a and 342b. The channel 344 has an open end 346a that facilitates or permits entry into the channel and a closed end 346b, opposite the open end 346a, defined by the flanges 340a, 340b. As also shown in FIG. 20, the second connector 330b further includes a pair of barbs 348. The barbs 348 are disposed on and project outwardly from opposite facing surfaces of the webs 342a, 342b, respectively, at or near respective distal ends 343b, 345b of the webs 342a, 342b. As such, the barbs 348 are disposed in a portion of the channel 344. Each of the barbs 348 is defined by a first outwardly facing surface 348a and a second outwardly facing surface 348b. Each first surface 348a is oriented at an approximately 66.7 degree angle relative to the respective web 342a, 342b. Each second surface 348b is oriented at an approximately 70 degree angle relative to the respective web 342a, 342b. As such, the first surfaces 348a generally correspond to the first surfaces 339a, and the second surfaces 348b generally correspond to the second surfaces 339b. In other embodiments, the first and/or second surfaces 348a, 348b can be oriented at different (e.g., greater or lesser) angles and yet still perform the intended functionality described herein.

So configured, the barbs 338a are arranged to interlock with the barbs 348 when the web 336 is disposed or inserted into the elongate channel 344, thereby locking the first connector portion 330a to the second connector portion 330b in the H-channel arrangement. As the web 336 is moved from the position shown in FIG. 20 and toward the channel 344 to the position shown in FIG. 21, the second surfaces 339b of the barbs 338a will engage or contact the second surfaces 348b of the barbs 348, which will, in turn, drive or push the surfaces 339a, 339b inward such that the barbs 338a can slide, in a first direction, past the barbs 348 and into the channel 344. Once the barbs 338a slide past the barbs 348, the surfaces 339a, 339b return to their original position, such that the barbs 338a are interlocked with the barbs 348. Due to the arrangement and orientation of the barbs 348 relative to the barbs 338a, preferably the barbs 338a cannot, without severely deforming or breaking, slide past the barbs 348 in the opposite direction, thereby preventing the web 336 from being pulled out of the channel 344.

With reference to FIG. 21, at each seam 120, the second connector portion 330b is disposed on top of the primary shock absorbing layer 108, such as directly on the bags 20, along the length of opposing facing edges 118a, 118b of adjacent tiles 112a, 112b. The facing edge 118a of the tile 112a abuts the outer surface of the web 342a. The facing edge 118b of the tile 112b abuts the outer surface of the web 342b. Optionally, a layer of adhesive 150, such as epoxy or other glue or a double sided tape, can be used to adhere at least one of the flanges 334a, 334b, 340a, 340b to the respective tile 112a, 112b. For example, a layer of adhesive can be disposed along the surface of each of the flanges 340a and 340b to adhere the flanges to the bottom surfaces 116b of the respective tiles 112a, 112b. The web 336 is inserted into the channel 344 until the flanges 334a, 334b engage the wear surface 116a of the respective tiles 112a, 112b. The barbs 338a interlock with the barbs 348. Further, the gripping ridges 338b engage against and into the wear surfaces 116a of the tiles 112a, 112b to prevent the tiles from pulling laterally away from the webs 342a, 342b.

The first connector portion 330a is preferably made of a resilient material (e.g., thermoplastic), such that the first connector portion 330a has an unflexed position or configuration (see FIG. 20) and a flexed position or configuration (see FIG. 21). As seen in FIG. 20, when the first connector portion 330a is in the unflexed position, each of the flanges 334a, 334b has a planar shape that is angled in the direction of the web 336 (e.g., downwardly as illustrated in FIG. 20) to be slightly out of coplanarity. In a preferred arrangement, each flange 334a, 334b is angled between approximately one degree and twenty five degrees out of plane toward the side of the web 336, and more preferably approximately five degrees out of plane. As seen in FIG. 21, when the first connector portion 330a is in the flexed position, each flange 334a, 334b has a planar shape that is flexed into substantial coplanarity by, for example, engagement against the tiles 112a, 112b. When the flanges 334a, 334b of the first connector portion 330a are engaged against a pair of adjacent tiles 112a, 112b the flanges 334a, 334b flex upwardly and resiliently grip the tiles 112a, 112b, such as, for example, by resiliently pressing the gripping ridges 338b into the surface of the tiles 112a, 112b. In this manner, the flanges 334a, 334b and the gripping ridges 338b together act to help prevent the adjacent tiles 112a, 112b from shifting away from each other.

In a preferred arrangement, (i) the first connector portion 330a has a width between opposite distal ends of the flanges 334a, 334b of between approximately two and three inches, and a flange thickness of approximately 0.06 inches, (ii) the web 336 has a height of approximately 0.3 inches and is disposed along a longitudinal centerline of the flanges 334a, 334b, (iii) the second connector portion 330b has a width between opposite distal ends of the flanges 340a, 340b of approximately 2.5 inches, and has a flange thickness of approximately 0.06 inches, (iv) the webs 342a, 342b each have a height of approximately 0.44 inches, and (v) the channel 344 has a width of approximately 0.164 inches. As with the first and second connector portions 130a, 130b, the first and second connector portions 330a, 330b are preferably extruded in a continuous length such that these portions 330a, 330b may be cut to any desired length. Other dimensions may prove suitable.

Those of skill in the art, upon reading the present disclosure, will understand that the teachings outlined herein may be applied to an entire playground area, to selected areas within a playground, or only to selected high traffic areas of a playground. Those of skill in the art will also understand that, although certain dimensions may be shown in the attached drawings, the dimensions ultimately may be chosen by the designer in order to meet the specific needs of a particular application.

Numerous modifications to the safety surface and components thereof disclosed herein will be apparent to those skilled in the art in view of the foregoing description. Accordingly, this description is to be construed as illustrative only and is presented for the purpose of enabling those skilled in the art to make and use the invention(s) and to teach the preferred mode of carrying out same. The exclusive rights to all modifications within the scope of the disclosure and the appended claims are reserved.

We claim:

1. A safety surface for use over a supporting base in a playground area, the safety surface comprising:
    a layer assembly consisting essentially of:
        a primary shock absorbing layer formed of a plurality of bags disposed horizontally adjacent each other across the playground area, each bag being flexible and filled with a plurality of pieces of shock absorbent material; and
        a top layer directly contacting the primary shock absorbing layer and defining an activity surface, the top layer being flexible; and
    a border along a horizontal periphery of the primary shock absorbing layer;
    wherein the top layer is retained by the border, and wherein the border and the top layer prevent the bags from migrating relative to each other.

2. The safety surface of claim 1, wherein the top layer is formed of at least a first piece and a second piece joined together by a channel connector extending along a seam between the first piece and the second piece, the channel connector having an upper connector portion and a lower connector portion, the upper connector portion disposed above the first and second pieces, the lower connector portion disposed below the first and second pieces, and the upper connector portion interlocked with the lower connector portion.

3. The safety surface of claim 2, wherein the upper connector portion comprises an elongate male interlocking profile and the lower connector portion comprises an elongate female interlocking profile.

4. The safety surface of claim 2, wherein the upper connector portion comprises a first flange and a second flange, the lower connector portion comprises a third flange and a fourth flange, wherein the first piece is clamped between the first and third flanges, and the second piece is clamped between the second and fourth flanges.

5. The safety surface of claim 4, further comprising an adhesive disposed along at least one of the first through fourth flanges and adhering the first piece to the lower connector portion.

6. The safety surface of claim 4, further comprising a gripping ridge disposed along at least one of the flanges, the gripping ridge engaged against at least one of the first and second pieces to prevent the piece from pulling away from the seam.

7. The safety surface of claim 4, wherein the upper connector portion has an unflexed position and a flexed position, wherein the first and second flanges are coplanar in the flexed position and at least one of the first and second flanges is angled away from coplanarity in the unflexed position.

8. The safety surface of claim 2, wherein each of the first piece and the second piece is in the form of a tile.

9. The safety surface of claim 8, wherein the tile is in the form of a planar sheet.

10. The safety surface of claim 9, wherein the tile has a thickness and a rectangular peripheral edge defining a length and a width.

11. The safety surface of claim 1, wherein the top layer and the primary absorbing layer are porous.

12. The safety surface of claim 1, wherein the top layer includes a plurality of drain holes.

13. The safety surface of claim 1, further comprising a lower layer disposed below the primary shock absorbing layer.

14. The safety surface of claim 13, wherein the lower layer comprises a porous geotextile.

15. The safety surface of claim 1, further comprising a base layer disposed underneath the primary shock absorbing layer to provide structural support to the primary shock absorbing layer and the top layer.

16. The safety surface of claim 15, wherein the base layer comprises a porous granular material.

17. The safety surface of claim 15, wherein the primary shock absorbing layer is disposed on the base layer.

18. The safety surface of claim 17, wherein the base layer is disposed on the lower layer.

19. The safety surface of claim 1, wherein the support surface is the ground.

20. The safety surface of claim 1, wherein at least one of the bags is formed of water permeable material.

21. The safety surface of claim 1, wherein at least one of the bags has an interior divided into a plurality of compartments by one or more dividers, each compartment containing shock absorbent material.

22. The safety surface of claim 1, further comprising a surface layer disposed over the top layer.

23. The safety surface of claim 22, wherein the surface layer comprises a matt of imitation turf.

24. A safety surface for use over a supporting base in a playground area, the safety surface comprising:
    a primary shock absorbing layer formed of a plurality of bags disposed horizontally adjacent each other across the playground area, each bag being flexible and filled with a plurality of pieces of shock absorbent material;
    a border along a horizontal periphery of the primary shock absorbing layer; and
    a top layer overlying the primary shock absorbing layer and defined an activity surface, the top layer being flexible and being retained by the border;
    wherein the border and the top layer prevent bags from migrating relative to each other, and wherein the border comprises an elongate body and lip, the elongate body abutting the periphery of the primary shock absorbing layer and the top layer, the lip overhanging the top layer to retain the top layer.

25. A safety surface for use over a supporting base in a playground area, the safety surface comprising:
- a primary shock absorbing layer formed of a plurality of bags disposed horizontally adjacent each other across the playground area, each bag being flexible and filled with a plurality of pieces of shock absorbent material;
- a border along a horizontal periphery of the primary shock absorbing layer; and
- a top layer overlying the primary shock absorbing layer and defining an activity surface, the top layer being flexible and being retained by the border;
- wherein the border and the top layer prevents the bags from migrating relative to each other, and wherein the border comprises a plurality of border sections including at least a first border section and a second border section, wherein the first border section is articulably joined to the second border section at an articulating joint.

26. The safety surface of claim 25, wherein the articulating join comprises a pin extending through aligned first and second bores of the first and second border sections.

27. The safety surface of claim 26, wherein the pin extends past the bottom of the first and second border sections to anchor the border in place.

28. The safety surface of claim 27, wherein the pin extends into the support surface.

29. A safety surface for use over a supporting base in a playground area, the safety surface comprising:
- a primary shock absorbing layer formed of a plurality of bags disposed horizontally adjacent each other across the playground area, each bag being flexible and filled with a plurality of pieces of shock absorbent material;
- a border along a horizontal periphery of the primary shock absorbing layer; and
- a top layer immediately adjacent the primary shock absorbing layer and defined an activity surface, the top layer being flexible and being retained by the border;
- wherein the border and the top layer prevent the bags from migrating relative to each other, and
- wherein a peripheral edge of the surface layer is retained underneath the lip of the border.

30. A safety surface for use over a supporting base in a playground area, the safety surface comprising:
- a primary shock absorbing layer formed of a plurality of bags disposed horizontally adjacent each other across the playground area, each bag being flexible and filled with a plurality of pieces of shock absorbent material;
- a border along a horizontal periphery of the primary shock absorbing layer; and
- a top layer overlying the primary shock absorbing layer and defining an activity surface, the top layer being flexible and being retained by the border;
- wherein the border and the top layer prevent the bags from migrating relative to each other, and
- wherein the top layer is formed of at least a first piece and a second piece joined together by a channel connector extending along a seam between the first piece and the second piece, the channel connector having an upper connector portion and a lower connector portion, the upper connector portion disposed above the first and second pieces, the lower connector portion disposed below the first and second pieces, and the upper connector portion interlocked with the lower connector portion, and
- wherein the upper connector comprises a first flange and a second flange, the lower connector comprises a third flange and a fourth flange, the first piece being clamped between the first and third flanges, and the second piece is clamped between the second and fourth flanges, and
- wherein the first and second flanges each include at least one gripping ridge configured to grip a respective portion of the first and second pieces.

\* \* \* \* \*